(12) United States Patent
Handelman

(10) Patent No.: US 7,720,379 B2
(45) Date of Patent: *May 18, 2010

(54) OPTICAL PACKET SWITCHING APPARATUS AND METHODS

(76) Inventor: Doron Handelman, 14 Hama'avak St., Givatayim (IL) 53520

( * ) Notice: Subject to any disclaimer, the term of this patent is extended or adjusted under 35 U.S.C. 154(b) by 12 days.

This patent is subject to a terminal disclaimer.

(21) Appl. No.: 12/020,558

(22) Filed: Jan. 27, 2008

(65) Prior Publication Data

US 2009/0129775 A1    May 21, 2009

Related U.S. Application Data

(60) Continuation of application No. 11/612,040, filed on Dec. 18, 2006, now Pat. No. 7,324,752, which is a division of application No. 11/461,459, filed on Aug. 1, 2006, now Pat. No. 7,218,853, which is a division of application No. 09/944,603, filed on Sep. 4, 2001, now Pat. No. 7,106,967.

(51) Int. Cl.
*H04J 14/00* (2006.01)
*H04J 4/00* (2006.01)

(52) U.S. Cl. .............................. 398/47; 398/54; 398/75; 370/232; 370/235; 370/540

(58) Field of Classification Search ........................ None
See application file for complete search history.

(56) References Cited

U.S. PATENT DOCUMENTS

| | | | |
|---|---|---|---|
| 4,626,075 A | 12/1986 | Chemla | 999/354 |
| 4,726,010 A | 2/1988 | Ali et al. | 370/3 |
| 4,856,093 A | 8/1989 | Mohr | 455/619 |
| 5,170,273 A | 12/1992 | Nishio | 359/128 |
| 5,191,457 A | 3/1993 | Yamazaki | 359/124 |
| 5,194,977 A | 3/1993 | Nishio | 359/128 |
| 5,319,484 A | 6/1994 | Jacob et al. | 359/123 |
| 5,325,222 A | 6/1994 | Jacob et al. | 359/123 |

(Continued)

OTHER PUBLICATIONS

"Double-Spreading Modulation Scheme Picks up Where CDMA and TDMA Leave Off," Electronics Designs, Jul. 10, 2000, pp. 28-32.

(Continued)

*Primary Examiner*—Nathan M Curs
(74) *Attorney, Agent, or Firm*—Dorsey & Whitney LLP

(57) ABSTRACT

An optical packet switch switches optical packets according to bit-rates at which the optical packets are provided. For example, optical packets that are received at similar bit-rates may be routed to a destination at separate time slots over a single channel wavelength, and optical packets that are received at different bit-rates may be routed to the destination over separate channel wavelengths. When optical packets are provided at different bit-rates on a plurality of input paths, optical packets provided at low bit-rates may be compacted before switching to the destination. Alternatively or additionally, the bit-rates of the optical packets may be balanced before switching to the destination. Bandwidth contention among optical packets may be resolved by polarizing optical packets originating from separate input paths in different polarization directions, and merging optical packets having different polarization directions onto a single switched channel wavelength. Compaction of optical packets may alternatively be employed for resolution of bandwidth contention. Related apparatus and methods are also described.

18 Claims, 15 Drawing Sheets

U.S. PATENT DOCUMENTS

| | | | | |
|---|---|---|---|---|
| 5,400,322 | A | 3/1995 | Hunt et al. | 370/19 |
| 5,416,625 | A | 5/1995 | Cavaciuti et al. | 359/137 |
| 5,452,115 | A | 9/1995 | Tomioka | 359/123 |
| 5,457,687 | A | 10/1995 | Newman | 370/85.3 |
| 5,479,447 | A | 12/1995 | Chow et al. | 375/260 |
| 5,557,439 | A | 9/1996 | Alexander et al. | 359/130 |
| 5,680,490 | A | 10/1997 | Cohen et al. | 385/24 |
| 5,712,932 | A | 1/1998 | Alexander et al. | 385/24 |
| 5,724,167 | A | 3/1998 | Sabella | 359/128 |
| 5,739,935 | A | 4/1998 | Sabella | 435/194 |
| 5,774,244 | A | 6/1998 | Tandon et al. | 359/125 |
| 5,867,289 | A | 2/1999 | Gerstel | 359/110 |
| 5,900,957 | A | 5/1999 | Van Der Tol | 398/54 |
| 5,953,138 | A | 9/1999 | Ellis | 359/123 |
| 6,023,360 | A | 2/2000 | Morioka et al. | 359/123 |
| 6,108,112 | A | 8/2000 | Touma | 359/110 |
| 6,204,944 | B1 | 3/2001 | Uchiyama et al. | 359/123 |
| 6,233,082 | B1 | 5/2001 | Johnson | 359/237 |
| 6,288,808 | B1* | 9/2001 | Lee et al. | 398/49 |
| 6,314,115 | B1 | 11/2001 | Delfyett et al. | 372/6 |
| 6,404,522 | B1 | 6/2002 | Handelman | 359/124 |
| 6,574,018 | B1 | 6/2003 | Handelman | 359/124 |
| 6,763,191 | B1 | 7/2004 | Handelman | 398/45 |
| 2002/0003641 | A1 | 1/2002 | Hall et al. | 359/122 |
| 2002/0186453 | A1 | 12/2002 | Yoo | 359/326 |
| 2003/0156841 | A1* | 8/2003 | Chraplyvy et al. | 398/79 |
| 2003/0215238 | A1 | 11/2003 | Milton et al. | 398/79 |
| 2005/0053058 | A1 | 3/2005 | Fice et al. | 370/374 |

OTHER PUBLICATIONS

"Fiber-Optic Chips Multiplex 16 T1/E1 Channels Over One Cable," Electronic Design, Apr. 17, 2000, p. 46.

"Lucent Upgrades Wavestar to 320-Channel, 800-Gb/s Transmission," Phototronics Spectra, Jun. 2000, p. 46.

"Single interferometer demultiplexes 40-Gbit/s optical-time-division-multiplexed signal," Laser Focus World, Nov. 1999, p. 11.

"Terabit/second-transmission demonstrations make a splash at OFC '96," Laser Focus World, Apr. 1996, p. 13.

Ashmead, "Spectral Equalization Keeps Optical," WM Solutions, Jan. 2001, 5-pages, www.optoelectronics-world.com.

Auerbach et al., "Use of Delegated Tuning and Forwarding in Wavelength Division Multiple Access Networks," IEEE Transactions on Communications, vol. 43, No. 1, Jan. 1995, pp. 52-63.

Binetti, et al., "Analysis and Dimensioning of Switchless Networks for Single-Layer Optical Architecture," Journal of Lightwave Technology, vol. 18, No. 2, Feb. 2000, pp. 144-153.

Blixt et al., "An Optical Technique for Bit and Packet Synchronization," IEEE Photonics Technology Letters, vol. 7, No. 1, Jan. 1995, pp. 123-125.

Bourgeois, "Fiber-based components meets the needs of next-generation amplifiers," WM Solutions, Mar. 2001, 5-pages, www.optoelectronics-world.com.

Collins et al., "Data express Gigabit junction with the next-generation Internet," IEEE Spectrum, Feb. 1999, pp. 18-25.

Eiselt et al., "All-Optical High Speed Demultiplexing with a Semiconductor Laser Amplifier in a loop Mirror Configuration," Electronics Letters, vol. 29, No. 13, Jun. 24, 1993, pp. 1167-1168.

Ellis et al., "Compact 40Gbit/s optical demultiplexer using a GaInAsP optical amplifier," Electronics Letters, vol. 29, No. 24, Nov. 25, 1993, pp. 2115-2116.

Ellis et al., "Transmission of a True Single Polarisation 40 Gbit/s Solution Data Signal Over 205km Using a Stabilised Erbium Fibre Ring Laser and 40 GHz Electronic Timing Recovery," Electronic Letters, vol. 29, No. 11, May 27, 1993, pp. 990-992.

Escobar, H., "Optical Networks Seek Reconfigurable Add/Drop Options," Photonics Spectra, Dec. 1998, pp. 163-167.

Flipse, R., "Optical Switches Ease Bandwidth Crunch," EuroPhotonics, Aug./Sep. 1998, pp. 44-45.

Forrest, G., "Optical amplifiers revolutionize communications," Laser Focus World, Sep. 1998, pp. 28-32.

Ganz et al., "Wavelength Assignment in Multihop Lightwave Networks," IEEE Transactions on Communications, vol. 42, No. 7, Jul. 1994, pp. 2460-2469.

Gibson, J., "The Communication Handbook," CRC Press & IEEE Press, 1997, Ch. 37: pp. 513-528; Ch. 39: pp. 542-553; Ch. 40: pp. 554-564; Ch. 46: pp. 622-649; Ch. 51: pp. 686-700; and Ch. 65: pp. 883-890.

Goldberg, L., "Photons at Work: Optical Networks on the Rise," Electronic Design, Mar. 22, 1999, pp. 56-66.

Green et al., "Direct Detection Lightwave Systems: Why Pay More?," IEEE LCS, Nov. 1990, pp. 36-49.

Hall et al., "100-Gbit/s Bitwise Logic," MIT Lincoln Laboratory, Optics Letters, vol. 23, No. 16, Aug. 15, 1998, pp. 144-153.

Hall et al., "An Ultrafast Variable Optical Delay Technique," IEEE Photonics Technology Letters, vol. 12, No. 2, Feb. 2000, pp. 208-210.

Hall et al., "Picosecond-Accuracy All-Optical Bit Phase Sensing Using a Nonlinear Optical Loop Mirror," IEEE Photonics Technology Letters, vol. 7, No. 8, Aug. 1995, pp. 935-937.

Hecht, J., "All-optical networks need optical switches," Laser Focus World, May 2000, pp. 189-196.

Hecht, J., "Optical switching promises cure for telecommunications logjam," Laser Focus World, Sep. 1998, pp. 69-72.

Hinton, H., "Photonics in Switching," IEEE LTS, Aug. 1992, pp. 26-35.

Hunter et al., "Approaches to Optical Internet Packet Switching," IEEE Communications Magazine, Sep. 2000, pp. 116-122.

Jalali et al., "Time Stretch Methods Capture Fast Waveforms," Microwaves & RF, Apr. 1999, pp. 62-69.

Jones et al., "A Justification for a Variable Bandwidth Allocation Methodology for SONET Virtually Concatenated SPEs," Lucent Technologies, Jul. 10-14, 2000.

Jones et al., "A Proposed Link Capacity Adjustment Scheme (LCAS) for SONET Virtually Concatenated SPEs," Lucent Technologies, TIXI.5/200-199, pp. 1-30, Oct. 9-13, 2000.

Jones et al., "Higher Order SONET Virtual Concatenation," Lucent Technologies, Apr. 9, 1999.

Jones-Bay, H., "Optical switches pursue crossconnect markets," Laser Focus World, May 1998, pp. 153-162.

Kamatani et al., "Prescaled 6.3GHz clock recovery from 50GBit/s TDM optical signal with 50GHz PLL using four-wave mixing in a traveling-wave laser diode optical amplifier," Electronics Letters, vol. 30, No. 10, May 10, 1994, pp. 807-809.

Kawanishi et al., "Ultra-High-Speed PLL-Type Clock Recovery Circuit Based on All-Optical Gain Modulation in Traveling-Wave Laser Diode Amplifier," Journal of Lightwave Technology, vol. 11, No. 12, Dec. 1993, pp. 2123-2129.

Kazovsky et al., "WDM Local Area Networks," IEEE LTS, May 1992, pp. 8-15.

Klovekorn et al., "Variable optical delay line with diffraction-limited autoalignment," Applied Optics, vol. 37, No. 10, Apr. 1, 1998, pp. 1903-1904.

Labourdette et al., "Branch-Exchange Sequences for Reconfiguration of Lightwave Networks," IEEE Transactions on Communications, vol. 42, No. 10, Oct. 1994, pp. 2822-2832.

Lam, J., "Designing Broadband Fiber Optic Communication Systems," Communication Systems Design Magazine, Feb. 1999, pp. 1-4, available at http://www.cdsmag.com.

Lerner, E., "Fiber amplifiers expand network capacities," Laser Focus World, Aug. 1997, pp. 85-96.

Lerner, E., "Multiple Wavelengths Exploit Fiber Capacity," Laser Focus World, Jul. 1997, pp. 119-125.

Lewotesky, K., "Multistage Amplifier Provides Gain Across 80nm," Laser Focus World, Sep. 1997, pp. 22-24.

Listanti et al., "Architectural and Technological Issues for Future Optical Internet Networks," IEEE Communications Magazine, Sep. 2000, pp. 82-92.

Maier et al., "Design and Cost Performance of the Multistage WDM-PON Access Networks," Journal of Lightwave Technology, vol. 18, No. 2, Feb. 2000, pp. 125-143.

McCarthy, D., "Photonic Switches: Fast, but Functional?," Photonics Spectra, Mar. 2001, pp. 140-150.

Miskovic, E., "Wavelength Lockers Keeps Laser in Line," Photonics Spectra, Feb. 1999, pp. 104-110.

Mochida, Y., "Technologies for Local-Access Fibering," IEEE Communication Magazine, Feb. 1994, pp. 64-73.

Mortensen, P., "Record Data Transmission Rate Reported at ECOC '96," Nov. 1996, pp. 40-42.

Nering, R., "Demand triggers advances in dense WDM components," Optoelectronics World, Sep. 1998, pp. S5-S8.

Pan et al., "Combining gratings and filters reduces WDM channel spacing," Optoelectronics World, Sep. 1998, pp. S11-S17.

Patrick et al., "Bit-Rate Flexible All-Optical Demultiplexing Using a Nonlinear Optical Loop Mirror," Electronics Letters, vol. 29, No. 8, Apr. 15, 1993, pp. 702-703.

Qiao, C., "Labeled Optical Burst Switching for IP-over-WDM Integration," IEEE Communications Magazine, Sep. 2000, pp. 104-114.

Rajagopalan et al., "IP Over Optical Networks: Architectural Aspects," IEEE Communications Magazine, Sep. 2000, pp. 94-102.

Robinson, "Router Promises Faster Switching," Photonics Technology World, Photonics Spectra, Aug. 2001, p. 24.

Rolland et al., "Multigigabit Networks: The Challenge," IEEE LTS, May 1992, pp. 16-26.

Sakamoto, T. et al., Variable optical delay circuit using wavelength converters, Electronics Letters, vol. 37, No. 7, Mar. 2001, pp. 454-455.

Suzuki et al., "Wavelength-Division Switching Technology in Photonic Switching Systems," IEEE International Conference on Communications ICC '90, pp. 1125-1129.

Toba et al., "Advanced Technology for Fiber Optic Subscriber Systems," IEEE LTS, Nov. 1992, pp. 12-18.

Wakui, "The Fiber-Optic Subscriber Network in Japan," IEEE Communications Magazine, Feb. 1994, pp. 56-63.

Wang et al., "Polarization Insensitive Widely Tunable All-Optical Clock Recovery Based on AM Mode-Locking of a Fiber Ring Laser," IEEE Photonics Technology Letters, vol. 12, No. 2, Feb. 2000, pp. 211-213.

Weiss, S., "Speed Demons: Is 'Faster' Better and Cheaper?," Photonics Spectra, Feb. 1999, pp. 96-102.

Wesson, et al., "Keep Your Photons in Line," Photonics Spectra, Sep. 1999, pp. 102-108.

Wheeler, M., "Ultrafast Optical Switch Unveiled," Photonics Spectra, Dec. 1998, p. 42.

Willner, A., "Mining the Optical Bandwidth for Terabit per Second," IEEE Spectrum, Apr. 1997, pp. 32-41.

Zankowsky, D., "Advances in Dense WDM Push Diode-Laser Design," Laser Focus World, Aug. 1997, pp. 167-172.

* cited by examiner

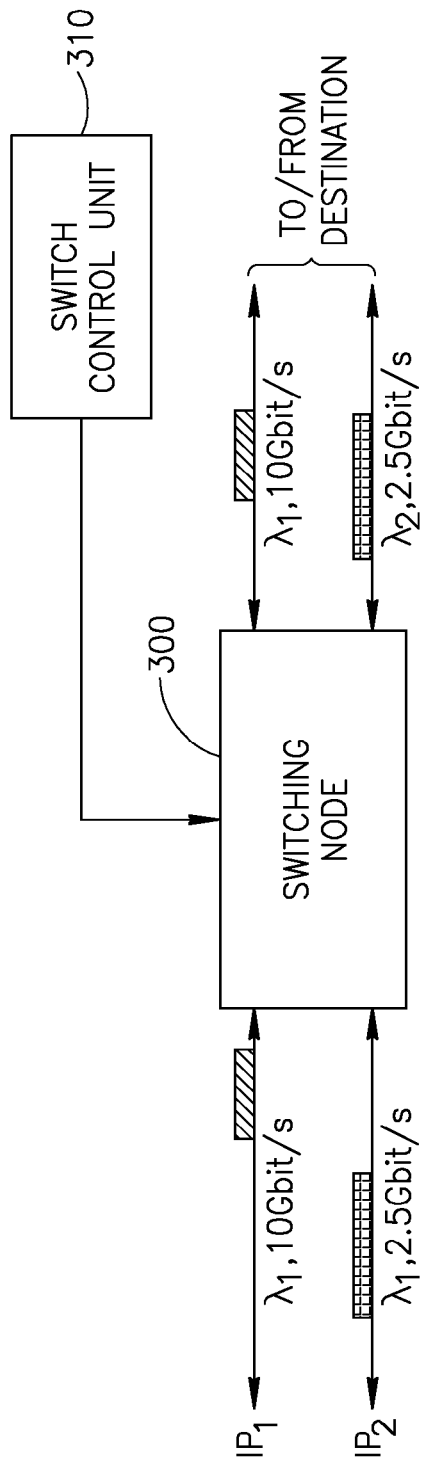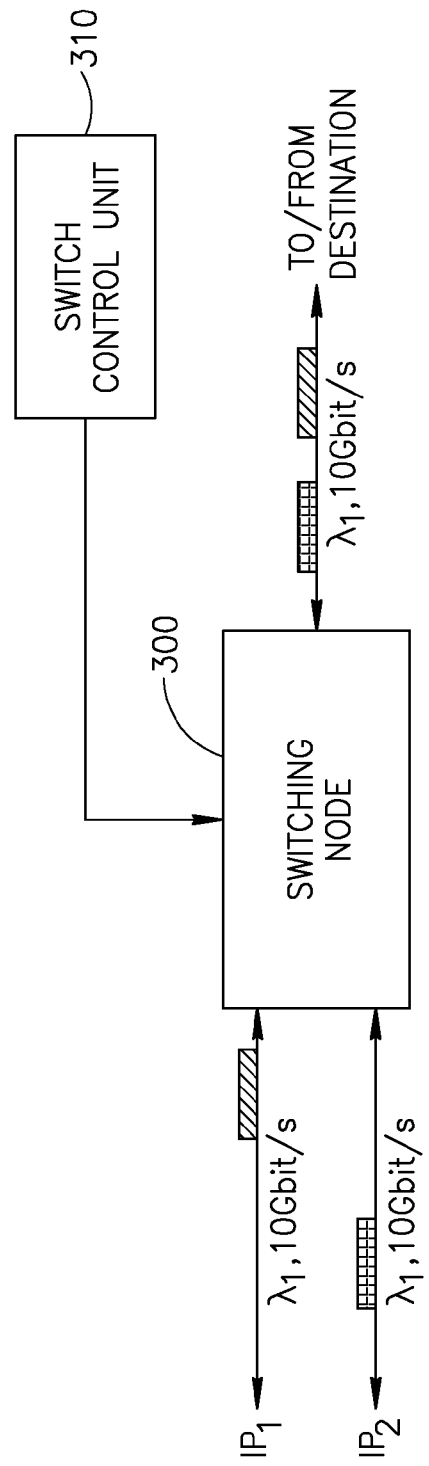

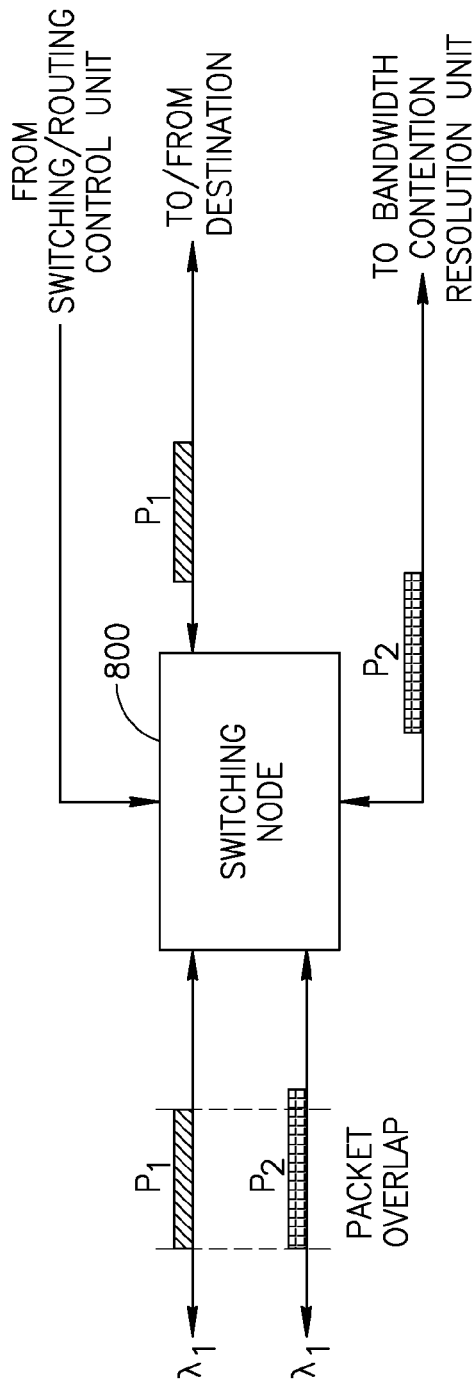
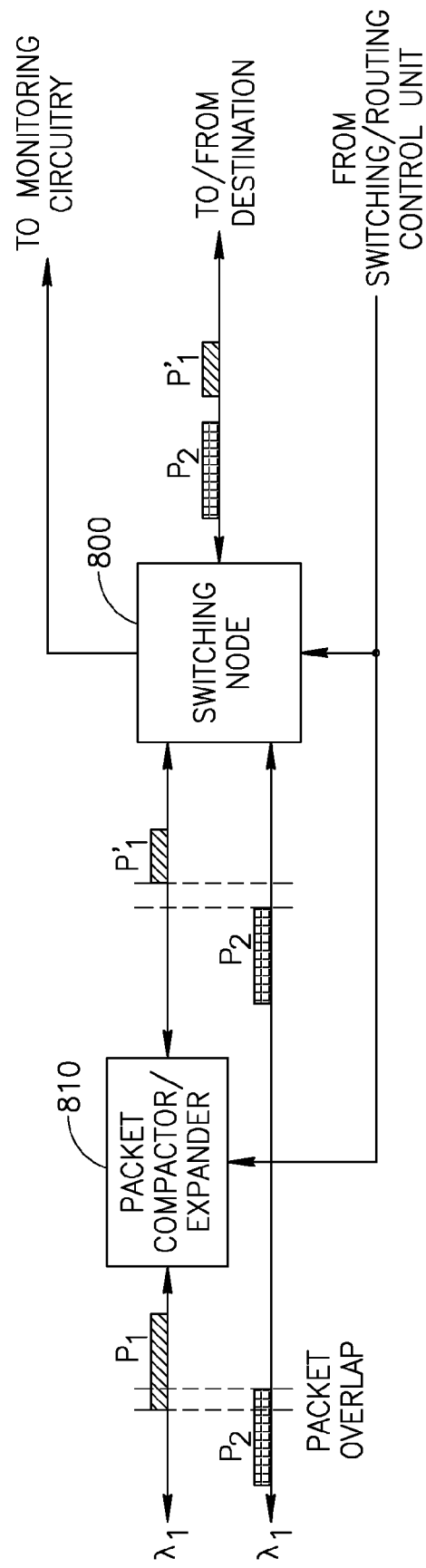
FIG.9A
FIG.9B

OPTICAL PACKET SWITCHING APPARATUS AND METHODS

CROSS-REFERENCE TO RELATED APPLICATIONS

This application is a continuation of U.S. patent application Ser. No. 11/612,040, filed Dec. 18, 2006, now U.S. Pat. No. 7,324,752, which is a divisional of U.S. patent application Ser. No. 11/461,459, filed Aug. 1, 2006, now U.S. Pat. No. 7,218,853, which is a divisional of U.S. patent application Ser. No. 09/944,603, filed Sep. 4, 2001, now U.S. Pat. No. 7,106,967.

The entire disclosures of these prior applications are considered to be part of the disclosure of the instant application and are hereby incorporated by reference therein.

FIELD OF THE INVENTION

The present invention relates generally to optical communication networks, and more particularly to optical packet switching in optical communication networks.

BACKGROUND OF THE INVENTION

The rapid growth of data communications and the deployment of optical communication systems that utilize wavelength division multiplexing (WDM) created a demand for new switching methods. Optical packet switching is considered today a switching method that is particularly suitable for data communications and for optical communication systems that utilize WDM.

There are two main techniques for optical packet switching, and they mainly differ in the structure of optical packets utilized thereby and in switching node operation. The first technique is based on fixed-length packets with synchronous node operation, and the second technique is based on variable-length packets with asynchronous node operation. Variable-length packets are also referred to as bursts and the second technique is also referred to as optical burst switching (OBS).

Basic aspects of the techniques for optical packet switching are described in the following publications:

an article entitled "Architectural and Technological Issues for Future Optical Internet Networks", by Listanti et al in *IEEE Communications Magazine*, September 2000, pages 82-92;

an article entitled "IP Over Optical Networks: Architectural Aspects", by Rajagopalan et al in *IEEE Communications Magazine*, September 2000, pages 94-102;

an article entitled "Labeled Optical Burst Switching for IP-over-WDM Integration", by Chunming Qiao in *IEEE Communications Magazine*, September 2000, pages 104-114; and an article entitled "Approaches to Optical Internet Packet Switching", by Hunter et al in *IEEE Communications Magazine*, September 2000, pages 116-122.

Both techniques of optical packet switching mentioned above have however similar problems that are encountered with bandwidth contention and switching of optical packets that are carried over optical paths at different bit-rates.

Bandwidth contention is defined as contention for a wavelength at the same time among optical packets arriving on a plurality of optical paths. In an optical switch that switches optical packets from a plurality of input paths to a plurality of output paths, bandwidth contention may occur frequently regardless of the switching technique that is used by the optical switch.

The problem encountered with switching of optical packets that are carried over optical paths at different bit-rates is independent of bandwidth contention, and in fact occurs both in a case where there is bandwidth contention and in a case where there is no bandwidth contention. The problem encountered with switching of optical packets that are carried over optical paths at different bit-rates may be appreciated by referring to the following example in which a conventional optical packet switch switches, to a single output path, optical packets that are provided over four input paths.

Considering, for example, a case in which there is no bandwidth contention among any of the optical packets carried over the four input paths, the optical packet switch can place the optical packets from all four input paths serially over the single output path. Typically, the optical packets carried over the output path are equally distributed so that every fourth optical packet originates from the same input path. If all four input paths carry the optical packets at the same input bit-rate of, for example, 10 Gigabit per second (Gbit/sec), an output bit-rate of the optical packets carried over the output path can reach, at best, 10 Gbit/sec.

However, if not all four input paths carry the optical packets at the same input bit-rate, such as when one input path carries optical packets at an input bit-rate of 2.5 Gbit/sec and each of the other three input paths carries optical packets at an input bit-rate of 10 Gbit/sec, an output bit-rate of optical packets carried over the output path can reach, at best, about 5.715 Gbit/sec. It is therefore apparent that in optical packet switching that involves switching of optical packets that are carried over input paths at different bit-rates, overall transmission speed over an output path can be adversely affected even by a single input path that carries optical packets at a low bit-rate. The overall transmission speed over the output path can be even more adversely affected when bandwidth contention is taken into account.

Therefore, techniques that can solve the problems encountered with bandwidth contention and switching of optical packets that are carried over optical paths at different bit-rates may be highly desired.

Some aspects of technologies and related art that may be useful in understanding the present invention are described in the following publications:

an article entitled "Mining the Optical Bandwidth for a Terabit per Second", by Alan Eli Willner in *IEEE Spectrum*, April 1997, pages 32-41;

an article entitled "Polarization Insensitive Widely Tunable All-Optical Clock Recovery Based on AM Mode-Locking of a Fiber Ring Laser", by Wang et al in *IEEE Photonics Technology Letters*, Vol. 12, No. 2, February 2000, pages 211-213;

an article entitled "Ultra-High-Speed PLL-Type Clock Recovery Circuit Based on All-Optical Gain Modulation in Traveling-Wave Laser Diode Amplifier", by Kawanishi et al in *Journal of Lightwave Technology*, Vol. 11, No. 12, December 1993, pages 2123-2129;

an article entitled "Prescaled 6.3 GHz clock recovery from 50 GBit/s TDM optical signal with 50 GHz PLL using four-wave mixing in a traveling-wave laser diode optical amplifier", by Kamatani et al in *Electronics Letters*, Vol. 30, No. 10, May 12, 1994, pages 807-809;

an article entitled "Variable optical delay line with diffraction-limited autoalignment" by Klovekorn et al in *Applied Optics*, Vol. 37, No. 10, Apr. 1, 1998, pages 1903-1904;

an article entitled "Picosecond-Accuracy All-Optical Bit Phase Sensing Using a Nonlinear Optical Loop Mirror", by Hall et al in *IEEE Photonics Technology Letters*, Vol. 7, No. 8, August 1995, pages 935-937;

an article entitled "An Ultrafast Variable Optical Delay Technique", by Hall et al in *IEEE Photonics Technology Letters*, Vol. 12, No. 2, February 2000, pages 208-210;

an article entitled "Optical switching promises cure for telecommunications logjam", by Jeff Hecht in *Laser Focus World*, September 1998, pages 69-72;

an article entitled "Design and Cost Performance of the Multistage WDM-PON Access Networks", by Maier et al in *Journal of Lightwave Technology*, Vol. 18, No. 2, February 2000, pages 125-143;

an article entitled "All-optical networks need optical switches", by Jeff Hecht in *Laser Focus World*, May 2000, pages 189-196;

a technology brief entitled "Lucent Upgrades Wavestar to 320-Channel, 800-Gb/s Transmission", in *Photonics Spectra*, June 2000, page 46;

an article entitled "Record Data Transmission Rate Reported at ECOC 96", by Paul Mortensen in *Laser Focus World*, November 1996, pages 40-42;

an article entitled "Multiple Wavelengths Exploit Fiber Capacity", by Eric J. Lerner in *Laser Focus World*, July 1997, pages 119-125;

an article entitled "Advances in Dense WDM Push Diode-Laser Design", by Diana Zankowsky in *Laser Focus World*, August 1997, pages 167-172;

an article entitled "Multistage Amplifier Provides Gain Across 80 nm", by Kristin Lewotesky in *Laser Focus World*, September 1997, pages 22-24;

an article entitled "WDM Local Area Networks", by Kazovsky et al in *IEEE LTS*, May 1992, pages 8-15;

an article entitled "Optical Switches Ease Bandwidth Crunch", by Rien Flipse in *EuroPhotonics*, August/September 1998, pages 44-45;

an article entitled "Speed Demons: Is 'Faster' Better and Cheaper?", by Stephanie A. Weiss in *Photonics Spectra*, February 1999, pages 96-102;

an article entitled "Wavelength Lockers Keeps Laser in Line", by Ed Miskovic in *Photonics Spectra*, February 1999, pages 104-110; an article entitled "Optical switches pursue crossconnect markets", by Hassaun Jones-Bay in *Laser Focus World*, May 1998, pages 153-162;

a conference review entitled "Optical amplifiers revolutionize communications", by Gary T. Forrest in *Laser Focus World*, September 1998, pages 28-32;

an article entitled "Combining gratings and filters reduces WDM channel spacing", by Pan et al in *Optoelectronics World*, September 1998, pages S11-S17;

an article entitled "Demand triggers advances in dense WDM components", by Raymond Nering in *Optoelectronics World*, September 1998, pages S5-S8;

an article entitled "Optical Networks Seek Reconfigurable Add/Drop Options", by Hector E. Escobar in *Photonics Spectra*, December 1998, pages 163-167;

an article entitled "Ultrafast Optical Switch Unveiled", by Michael D. Wheeler in *Photonics Spectra*, December 1998, page 42;

an article entitled "Data express Gigabit junction with the next-generation Internet", by Collins et al in *IEEE Spectrum*, February 1999, pages 18-25;

an article entitled "Designing Broadband Fiber Optic Communication Systems", by Juan F. Lam in *Communication Systems Design* magazine, February 1999, pages 1-4 at http://www.csdmag.com;

an article entitled "Terabit/second-transmission demonstrations make a splash at OFC '96", in *Laser Focus World*, April 1996, page 13;

an article entitled "Multigigabit Networks: The Challenge", by Rolland et al in *IEEE LTS*, May 1992, pages 16-26;

an article entitled "Direct Detection Lightwave Systems: Why Pay More?", by Green et al in *IEEE LCS*, November 1990, pages 36-49;

an article entitled "Photonics in Switching", by H. Scott Hinton in *IEEE LTS*, August 1992, pages 26-35;

an article entitled "Advanced Technology for Fiber Optic Subscriber Systems", by Toba et al in *IEEE LTS*, November 1992, pages 12-18;

an article entitled "Fiber amplifiers expand network capacities", by Eric J. Lerner in *Laser Focus World*, August 1997, pages 85-96;

an article entitled "Technologies for Local-Access Fibering", by Yukou Mochida in *IEEE Communications Magazine*, February 1994, pages 64-73;

an article entitled "Wavelength Assignment in Multihop Lightwave Networks", by Ganz et al in *IEEE Transactions on Communications*, Vol. 42, No. 7, July 1994, pages 2460-2469;

an article entitled "Wavelength-Division Switching Technology in Photonic Switching Systems", by Suzuki et al in IEEE International Conference on Communications ICC '90, pages 1125-1129;

an article entitled "Branch-Exchange Sequences for Reconfiguration of Lightwave Networks", by Labourdette et al in *IEEE Transactions on Communications*, Vol. 42, No. 10, October 1994, pages 2822-2832;

an article entitled "Use of Delegated Tuning and Forwarding in Wavelength Division Multiple Access Networks", by Auerbach et al in *IEEE Transactions on Communications*, Vol. 43, No. 1, January 1995, pages 52-63;

an article entitled "Compact 40 Gbit/s optical demultiplexer using a GaInAsP optical amplifier", by Ellis et al in *Electronics Letters*, Vol. 29, No. 24, Nov. 25, 1993, pages 2115-2116;

an article entitled "Bit-Rate Flexible All-Optical Demultiplexing Using a Nonlinear Optical Loop Mirror", by Patrick et al in *Electronics Letters*, Vol. 29, No. 8, Apr. 15, 1993, pages 702-703;

an article entitled "All-Optical High Speed Demultiplexing with a Semiconductor Laser Amplifier in a loop Mirror Configuration", by Eiselt et al in *Electronics Letters*, Vol. 29, No. 13, Jun. 24, 1993, pages 1167-1168;

an article entitled "Photonic Switches: Fast, but Functional?", by Daniel C. McCarthy in *Photonics Spectra*, March 2001, pages 140-150;

U.S. Pat. No. 5,170,273 to Nishio which describes a cross-talk reducing optical switching system which receives electrical digital signals at its input terminal;

U.S. Pat. No. 5,191,457 to Yamazaki that describes a WDM optical communication network in which optical beams are modulated by channel discrimination signals of different frequencies;

U.S. Pat. No. 5,194,977 to Nishio that describes a wavelength division switching system with reduced optical components using optical switches;

U.S. Pat. No. 5,557,439 to Alexander et al. that describes wavelength division multiplexed optical communication systems configured for expansion with additional optical signal channels;

U.S. Pat. No. 5,680,490 to Cohen et al. that describes a comb splitting system which demultiplexes and/or multiplexes a plurality of optical signal channels at various wavelengths;

U.S. Pat. No. 5,712,932 to Alexander et al. that describes reconfigurable wavelength division multiplexed systems which include configurable optical routing systems;

U.S. Pat. Nos. 5,724,167 and 5,739,935 to Sabella that describe an optical cross-connect node architecture that interfaces plural optical fiber input and output links, each link containing plural wavelength channels;

U.S. Pat. No. 5,457,687 to Newman that describes reactive congestion control in an ATM network where the network is formed by the interconnection of nodes each including a forward path for transfer of information from source to destination through the network and a return path for returning congestion control signals;

U.S. Pat. No. 5,774,244 to Tandon et al. that describes an optical communications network that includes a plurality of passive optical networks (PONs) connected in a ring in PON address order, in which communication channels between terminals are wavelength multiplexed;

U.S. Pat. No. 6,233,082 to Johnson that describes an optical transmitter for generating any one of N carrier signals for use in an M-channel WDM system; and The following chapters in *The Communications Handbook*, CRC Press & IEEE Press, 1997, Editor-in-Chief Jerry D. Gibson: Chapter 37 on pages 513-528; Chapter 39 on pages 542-553; Chapter 40 on pages 554-564; Chapter 46 on pages 622-649; Chapter 51 on pages 686-700; and Chapter 65 on pages 883-890.

U.S. patent application Ser. No. 09/126,378, now U.S. Pat. No. 6,404,522, describes improvements in communication performance of an optical communication system that communicates data via N different channel wavelengths using WDM.

U.S. patent application Ser. No. 09/389,345, now U.S. Pat. No. 6,574,018, describes a network control system that may be embodied in various elements of a communication network that communicates optical signals multiplexed by WDM. The network control system may limit a number of channel wavelengths actually used for communicating optical signals to an end node, and control and modify data rates carried over channel wavelengths multiplexed by WDM.

U.S. patent application Ser. No. 09/624,983, now U.S. Pat. No. 6,763,191, describes an optical switching apparatus that selectively combines and separates series of optical signal samples using OTDM and/or WDM.

The disclosures of all references mentioned above and throughout the present specification are hereby incorporated herein by reference.

SUMMARY OF THE INVENTION

The present invention seeks to improve optical packet switching and routing in optical communication networks of both fixed-length optical packets and variable-length optical packets.

In the present invention, switching of optical packets is performed according to bit-rates at which the optical packets are provided. For example, optical packets that are received at similar bit-rates may be routed to a destination at separate time slots over a single channel wavelength, and optical packets that are received at different bit-rates may be routed to the destination over separate channel wavelengths. Alternatively, optical packets that are received at similar bit-rates may be switched via a single optical communication switch, and optical packets that are received at different bit-rates may be switched via different optical communication switches. A bit-rate at which an optical packet is provided may be determined by analyzing a bit-rate identifier in a header associated with the optical packet.

When optical packets are provided at different bit-rates on a plurality of input paths, optical packets provided at low bit-rates may be compacted before switching to a destination. Alternatively or additionally, the bit-rates of the optical packets may be balanced before switching to the destination.

If optical packets contend for bandwidth, bandwidth contention may be resolved by polarizing optical packets originating from separate input paths in different polarization directions, and merging optical packets having different polarization directions onto a single switched channel wavelength. Compaction of optical packets may alternatively be employed for resolution of bandwidth contention.

Further objects and features of the present invention will become apparent to those skilled in the art from the following description and the accompanying drawings.

There is thus provided in accordance with a preferred embodiment of the present invention an optical packet switching method for use at a switching node that receives a first optical packet on a first input path at a first bit-rate and a second optical packet on a second input path at a second bit-rate, the method including routing the first optical packet to a destination over a first channel wavelength and the second optical packet to the destination over a second channel wavelength if a magnitude of a difference between the first bit-rate and the second bit-rate exceeds a bit-rate difference threshold, and routing the first optical packet and the second optical packet to the destination at separate time slots over a single channel wavelength if the magnitude of a difference between the first bit-rate and the second bit-rate does not exceed the bit-rate difference threshold.

Preferably, each of the first optical packet and the second optical packet includes one of the following: a fixed-length optical packet, and a variable-length optical packet.

Additionally, the method may also include determining the magnitude of a difference between the first bit-rate and the second bit-rate prior to the routing. The determining preferably includes obtaining a first bit-rate identifier associated with the first optical packet by analyzing a first header associated with the first optical packet, obtaining a second bit-rate identifier associated with the second optical packet by analyzing a second header associated with the second optical packet, and comparing the first bit-rate identifier with the second bit-rate identifier to obtain the magnitude of a difference between the first bit-rate and the second bit-rate. Each of the first bit-rate identifier and the second bit-rate identifier preferably includes at least one of the following: a source identifier, a label, and an overhead byte.

Preferably, the bit-rate difference threshold is about zero.

Further in accordance with a preferred embodiment of the present invention there is provided an optical packet switching method for use at a switching node that receives a first optical packet on a first input path at a first bit-rate and a second optical packet on a second input path at a second bit-rate, the method including determining a magnitude of a difference between the first bit-rate and the second bit-rate, and, if the magnitude of a difference between the first bit-rate and the second bit-rate exceeds a bit-rate difference threshold, switching the first optical packet to a destination via a first optical communication switch that is operatively associated with the destination and the second optical packet to the destination via a second optical communication switch that is operatively associated with the destination, and if the magnitude of a difference between the first bit-rate and the second bit-rate does not exceed the bit-rate difference threshold switching the first optical packet and the second optical packet to the destination via a single optical communication switch that is operatively associated with the destination. Each of the first optical packet and the second optical packet preferably includes one of the following: a fixed-length optical packet, and a variable-length optical packet.

Preferably, the first optical communication switch is adapted to switch optical packets at bit-rates having a magnitude of the first bit-rate, and the second optical communication switch is adapted to switch optical packets at bit-rates having a magnitude of the second bit-rate.

Yet further in accordance with a preferred embodiment of the present invention there is provided an optical packet switching method for use at a switching node that receives N series of optical packets on N input paths at N bit-rates respectively, where N is an integer greater than two, the method including arranging the N series of optical packets as K groups of series of optical packets, where K≦N and the K groups are characterized in that each group includes series of optical packets having substantially similar bit-rates, and bit-rates of series in each group differ from bit-rates of series in other groups, allocating K separate channel wavelengths for communicating the K groups of series of optical packets to a destination, and routing optical packets in each group on a corresponding one of the K separate channel wavelengths to the destination.

Preferably, each optical packet in the N series of optical packets includes one of the following: a fixed-length optical packet, and a variable-length optical packet.

The arranging preferably includes determining the N bit-rates by obtaining a bit-rate identifier from a header associated with at least one optical packet in each of the N series. Each bit-rate identifier preferably includes at least one of the following: a source identifier, a label, and an overhead byte.

There is also provided in accordance with another preferred embodiment of the present invention an optical packet switching method for switching to an output path optical packets provided at a plurality of bit-rates on a plurality of input paths, the method including balancing the bit-rates of the optical packets with respect to each other up to a bit-rate difference level within a predetermined equalization range so as to obtain optical packets having balanced bit-rates, and switching the optical packets having balanced bit-rates to the output path on a single switched channel wavelength. The predetermined equalization range is preferably of about zero range.

Preferably, each optical packet includes one of the following: a fixed-length optical packet, and a variable-length optical packet.

In accordance with yet another preferred embodiment of the present invention there is also provided a method of resolving bandwidth contention between a first optical packet arriving on a first path and a second optical packet arriving on a second path, the method including determining that the bandwidth contention can be resolved by compaction of at least one of the first optical packet and the second optical packet, compacting the at least one of the first optical packet and the second optical packet in response to the determining, and switching the first optical packet and the second optical packet, at least one of which being in a compacted form, to a destination on a single switched channel wavelength.

Preferably, each of the first optical packet and the second optical packet includes one of the following: a fixed-length optical packet, and a variable-length optical packet.

The determining preferably includes determining a compaction factor, and the compacting includes compacting the at least one of the first optical packet and the second optical packet by the compaction factor.

Additionally, the method may also include updating the destination of the compacting. Further additionally, the method may also include routing a replica of at least one of the following to monitoring circuitry: the first optical packet, the second optical packet, a compacted form of the first optical packet, and a compacted form of the second optical packet.

In accordance with still another preferred embodiment of the present invention there is also provided a method of resolving bandwidth contention between a first optical packet arriving on a first path and a second optical packet arriving on a second path, the method including polarizing the first optical packet in a first polarization direction to obtain a first polarized optical packet, and the second optical packet in a second polarization direction to obtain a second polarized optical packet, and merging the first polarized optical packet and the second polarized optical packet onto a single switched channel wavelength. Preferably, the first polarization direction and the second polarization direction are orthogonal.

Additionally, the method may also include amplifying the first polarized optical packet and the second polarized optical packet prior to the merging and/or after the merging.

Preferably, each of the first optical packet and the second optical packet includes one of the following: a fixed-length optical packet, and a variable-length optical packet.

Further in accordance with yet another preferred embodiment of the present invention there is also provided an optical packet switching method for switching an optical packet provided at a first bit-rate, the method including compacting the optical packet provided at a first bit-rate so as to generate a compact optical packet at a second bit-rate, the second bit-rate being greater than the first bit-rate, and switching the compact optical packet to an output path associated with a destination.

Preferably, the optical packet includes one of the following: a fixed-length optical packet, and a variable-length optical packet.

The compacting preferably includes selecting a compaction factor, and compacting the optical packet by the compaction factor.

Additionally, the method may also include updating the destination of the compacting, for example, by providing to the destination an indication of the compacting and at least one of the following: the compaction factor, and the first bit-rate. Further additionally, the method may also include routing a replica of at least one of the following to monitoring circuitry: the optical packet, and the compact optical packet.

There is also provided in accordance with a preferred embodiment of the present invention an optical packet switch for switching to an output path associated with a destination a first optical packet received on a first input path at a first bit-rate and a second optical packet received on a second input path at a second bit-rate, the optical packet switch including a switching/routing control unit, and at least one switching node operatively controlled by the switching/routing control unit and operative to route the first optical packet to the output path over a first channel wavelength and the second optical packet to the output path over a second channel wavelength if a magnitude of a difference between the first bit-rate and the second bit-rate exceeds a bit-rate difference threshold, and to route the first optical packet and the second optical packet to the output path at separate time slots over a single channel wavelength if the magnitude of a difference between the first bit-rate and the second bit-rate does not exceed the bit-rate difference threshold.

There is also provided in accordance with another preferred embodiment of the present invention an optical packet switch for switching to a destination a first optical packet received on a first input path at a first bit-rate and a second optical packet received on a second input path at a second bit-rate, the optical packet switch including a switching/routing control unit operative to determine a magnitude of a difference between the first bit-rate and the second bit-rate, and at least one switching node operatively controlled by the switching/routing control unit and operative, if the magnitude of a difference between the first bit-rate and the second bit-rate exceeds a bit-rate difference threshold, to switch the first optical packet to the destination via a first optical communication switch that is operatively associated with the destination and the second optical packet to the destination via a second optical communication switch that is operatively associated with the destination, and, if the magnitude of a difference between the first bit-rate and the second bit-rate does not exceed the bit-rate difference threshold, to switch the first optical packet and the second optical packet to the destination via a single optical communication switch that is operatively associated with the destination.

Further in accordance with another preferred embodiment of the present invention there is also provided an optical packet switch for switching to a destination N series of optical packets received on N input paths at N bit-rates respectively, where N is an integer greater than two, the optical packet switch including a switching/routing control unit operative to arrange the N series of optical packets as K groups of series of optical packets, where K≦N and the K groups are characterized in that each group includes series of optical packets having substantially similar bit-rates, and bit-rates of series in each group differ from bit-rates of series in other groups, the switching/routing control unit being further operative to allocate K separate channel wavelengths for communicating the K groups of series of optical packets to the destination, and at least one switching node operatively controlled by the switching/routing control unit and operative to route optical packets in each group on a corresponding one of the K separate channel wavelengths to the destination.

In accordance with still another preferred embodiment of the present invention there is also provided an optical packet switch for switching optical packets provided at a plurality of bit-rates on a plurality of input paths to an output path, the optical packet switch including a bit-rate balancing apparatus operative to balance the bit-rates of the optical packets with respect to each other up to a bit-rate difference level within a predetermined equalization range so as to obtain optical packets having balanced bit-rates, and at least one switching node operatively associated with the bit-rate balancing apparatus and operative to switch the optical packets having balanced bit-rates to the output path on a single switched channel wavelength.

The bit-rate balancing apparatus preferably includes a control unit, and an interface unit operatively controlled by the control unit and operative to receive the optical packets provided at a plurality of bit-rates on a plurality of input paths and to employ at least one packet compactor/expander which is operative to compact/expand at least some of the optical packets in order to obtain the optical packets having balanced bit-rates.

In accordance with yet another preferred embodiment of the present invention there is also provided apparatus for resolving bandwidth contention between a first optical packet arriving on a first path and a second optical packet arriving on a second path, the apparatus including a switching/routing control unit operative to generate a determination that the bandwidth contention can be resolved by compaction of at least one of the first optical packet and the second optical packet, at least one packet compactor operatively controlled by the switching/routing control unit and operative to compact the at least one of the first optical packet and the second optical packet in accordance with the determination, and at least one switching node operatively controlled by the switching/routing control unit and operative to switch the first optical packet and the second optical packet, at least one of which being in a compacted form, to a destination on a single switched channel wavelength.

In accordance with still another preferred embodiment of the present invention there is also provided a polarizing apparatus for resolving bandwidth contention between a first optical packet arriving on a first path and a second optical packet arriving on a second path, the apparatus including at least one polarizer operative to polarize the first optical packet in a first polarization direction to obtain a first polarized optical packet, and the second optical packet in a second polarization direction to obtain a second polarized optical packet, and a combiner operative to merge the first polarized optical packet and the second polarized optical packet onto a single switched channel wavelength.

In accordance with another preferred embodiment of the present invention there is also provided an optical packet switch for switching an optical packet provided at a first bit-rate, the optical packet switch including a switching/routing control unit, at least one packet compactor/expander operatively controlled by the switching/routing control unit and operative to compact the optical packet provided at the first bit-rate so as to generate a compact optical packet at a second bit-rate, the second bit-rate being greater than the first bit-rate, and at least one switching node operatively associated with the at least one packet compactor/expander and the switching/routing control unit and operative to switch the compact optical packet to an output path associated with a destination.

BRIEF DESCRIPTION OF THE DRAWINGS

The present invention will be understood and appreciated more fully from the following detailed description, taken in conjunction with the drawings in which:

FIGS. 4A and 4B together constitute a simplified partly pictorial, partly block diagram illustration of a mode of operation of the apparatus of FIGS. 1-3 at a single switching node level;

FIGS. 9A and 9B together constitute a simplified partly pictorial, partly block diagram illustration of another mode of operation of the apparatus of FIGS. 1-3;

DETAILED DESCRIPTION OF PREFERRED EMBODIMENTS

Figure 1:
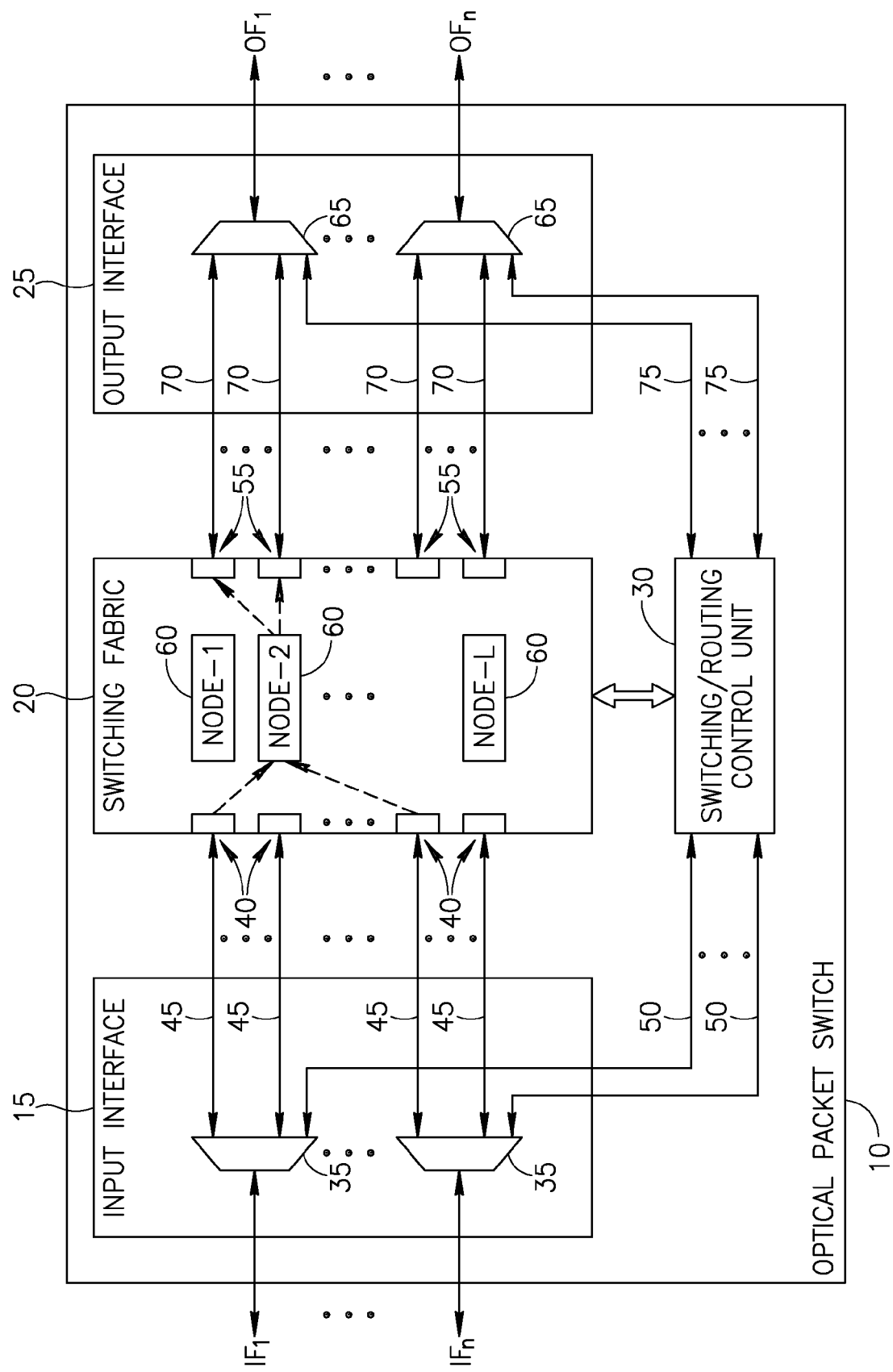
FIG. 1 is a simplified block diagram illustration of a preferred implementation of an optical packet switch, the optical packet switch being constructed and operative in accordance with a preferred embodiment of the present invention.

Reference is now made to FIG. 1 which is a simplified block diagram illustration of a preferred implementation of an optical packet switch 10, the optical packet switch 10 being constructed and operative in accordance with a preferred embodiment of the present invention.

The optical packet switch 10 preferably includes the following elements: an input interface 15; a switching fabric 20; an output interface 25; and a switching/routing control unit 30.

The input interface 15 is preferably operatively associated with a plurality of incoming fibers (IFs), such as n incoming fibers $IF_1, \ldots, IF_n$ where n is an integer. The n incoming fibers $IF_1, \ldots, IF_n$ are preferably respectively coupled to n optical demultiplexers 35 in the input interface 15. The n optical demultiplexers 35 are operative to demultiplex optical signals carried by the incoming fibers $IF_1, \ldots, IF_n$ and to provide optical packets carrying information to a plurality of input ports 40 of the switching fabric 20 over a plurality of channel wavelengths (also referred to as optical channels) 45, and control information including optical packets and headers of optical packets to the switching/routing control unit 30 over n control channel wavelengths 50.

The switching fabric 20 preferably includes, in addition to the plurality of input ports 40, a plurality of output ports 55 and a plurality of switching nodes 60, such as L switching nodes, where L is an integer greater than one. The term "switching node" is used throughout the present specification and claims in a broad sense to include an element or a junction of an optical communication switch that switches optical packets and optical signals received thereat to at least one of the following: another switching node; a port of the optical communication switch; and an external network element. Each input port and output port of a switching fabric in the optical communication switch may also be a switching node. The term "switching node" also covers an entire optical communication switch. In a multi-stage optical communication switch, switching nodes are arranged in stages such that a switching node may switch optical signals received thereat from a lower stage node to a higher stage node.

The term "switching node" is further used throughout the present specification and claims to cover a passive switching node as well as an active switching node. The term "passive switching node" is used throughout the present specification and claims to include a switching node that operates passively under control of a switching/routing control unit, that is the passive switching node only routes an optical packet to an output path without altering the optical packet or determining an operation to be performed on the optical packet such as a change of a channel wavelength over which the optical packet is carried. Any operation to be performed on the optical packet, except for the routing of the optical packet, is typically carried out external of the passive switching node. It is appreciated that passive switching nodes may be implemented, for example, by conventional optical Micro-Electro-Mechanical Systems (MEMS).

The term "active switching node" is used throughout the present specification and claims to include a switching node that has means for performing operations on the optical packet, such means including, for example, a wavelength converter that changes a channel wavelength over which the optical packet is outputted and a fiber delay line (FDL) that provides optical buffering by delaying the optical packet. The operations on the optical packet are therefore carried out within the active switching node, typically under control of a switching/routing control unit.

Preferably, the switching/routing control unit 30 processes the control information received thereat from the optical demultiplexers 35 and generates control settings that are used to control routing of the optical packets from the input ports 40 to the output ports 55 through the switching nodes 60. Referring for example, and without limiting the description, to the switching fabric 20 as a one-stage switching fabric, optical packets can be switched from the input ports 40 to the output ports 55 via one set of switching nodes 60 corresponding to the plurality of output ports 55.

In the embodiment depicted in FIG. 1, the switching nodes 60 in the optical packet switch 10 are preferably active switching nodes.

It is however appreciated that the present invention is not limited to the configuration depicted in FIG. 1. Rather, the switching fabric 20 may be replaced by a multi-stage switching fabric (not shown), or alternatively by a switching fabric (not shown) in which there are only input/output ports that serve as switching nodes that receive optical packets and output switched optical packets.

Preferably, regardless of the node configuration of the switching fabric 20, switched optical packets are received at the output ports 55 and provided to n optical multiplexers 65 in the output interface 25 via a plurality of output paths 70. The n optical multiplexers 65 preferably multiplex optical packets provided via the output paths 70 according to control information including optical packets and headers of optical packets provided by the switching/routing control unit 30 over n control channel wavelengths 75. The n multiplexers 65 preferably output multiplexed optical packets to n outgoing fibers $OF_1, \ldots, OF_n$.

Preferably, each switching node 60 may receive optical packets from more than one input port 40 over more than one channel wavelength. Each switching node 60 may thus output optical packets originating from different incoming fibers and originally carried over different channel wavelengths. Each switching node 60 preferably outputs the optical packets to one or more of the plurality of output paths 70 via one or more of the plurality of output ports 55. The output paths 70 are preferably ultimately associated with one or more destinations via one of the outgoing fibers $OF_1, \ldots, OF_n$.

The term "destination" is used throughout the specification and claims to include a network element (NE) towards which transmission from another NE is directed. A destination may typically include one of the following: a router; a server; a remote optical communication switch; and a user terminal. A destination is therefore typically capable of receiving optical packets over one channel wavelength or more than one channel wavelength from a single NE. A destination is also capable of receiving optical packets from a plurality of separate network elements over a plurality of channel wavelengths.

The term "output path" is used throughout the specification and claims to include a path such as a channel wavelength over which optical packets and optical signals are conveyed when outputted from an optical packet switch element such as a switching node. The output path is typically combined, with additional output paths and provided, together with the additional output paths, via any suitable medium such as a lightguide within the element, or a fiber optic cable within the element or attached to the element. A portion of the output path, or even the whole output path, may include an optical wireless path. The output path may ultimately be associated with a destination along a route obtained, for example, through an output port of an optical packet switch, an optical multiplexer/demultiplexer (MUX/DEMUX) coupled to the output port and a fiber optic cable associated with the optical MUX/DEMUX. Alternatively, the output path may ultimately be associated with a destination along a route obtained, for example, through a wireless transmitter that wirelessly communicates with the destination. The terms "output path" and "destination route" are interchangeably used throughout the present specification and claims.

It is appreciated that the optical packet switch 10 may be embodied in a single integrated element (not shown) in which case the input interface 15, the switching fabric 20, the output interface 25, and at least a portion of the switching/routing control unit 30 may form part of the single integrated element.

In operation, the optical packet switch 10 receives optical packets at the input interface 15 and provides the optical packets to the switching fabric 20 and control information including control optical packets and/or headers of optical packets to the switching/routing control unit 30. The switching/routing control unit 30 preferably configures the switching nodes 60 in the switching fabric 20 in a switching configuration that is suitable for switching the optical packets to the outgoing fibers $OF_1, \ldots, OF_n$ via the output interface 25. The switching configuration may be, for example, one of the following: a pre-selected configuration; a configuration determined substantially in real-time; and a programmed configuration programmed by a processor (not shown) that may be form part of the switching/routing control unit 30 or may be external thereof.

It is appreciated that the optical packet switch 10 may preferably operate in half-duplex or full duplex communication. In such a case, optical packets may be inputted to the optical packet switch 10 either via $IF_1, \ldots, IF_n$ or $OF_1, \ldots, OF_n$ and outputted via $OF_1, \ldots, OF_n$ or $IF_1, \ldots, IF_n$ respectively by following similar tracks in the optical packet switch 10 but in opposite directions.

Figure 2:
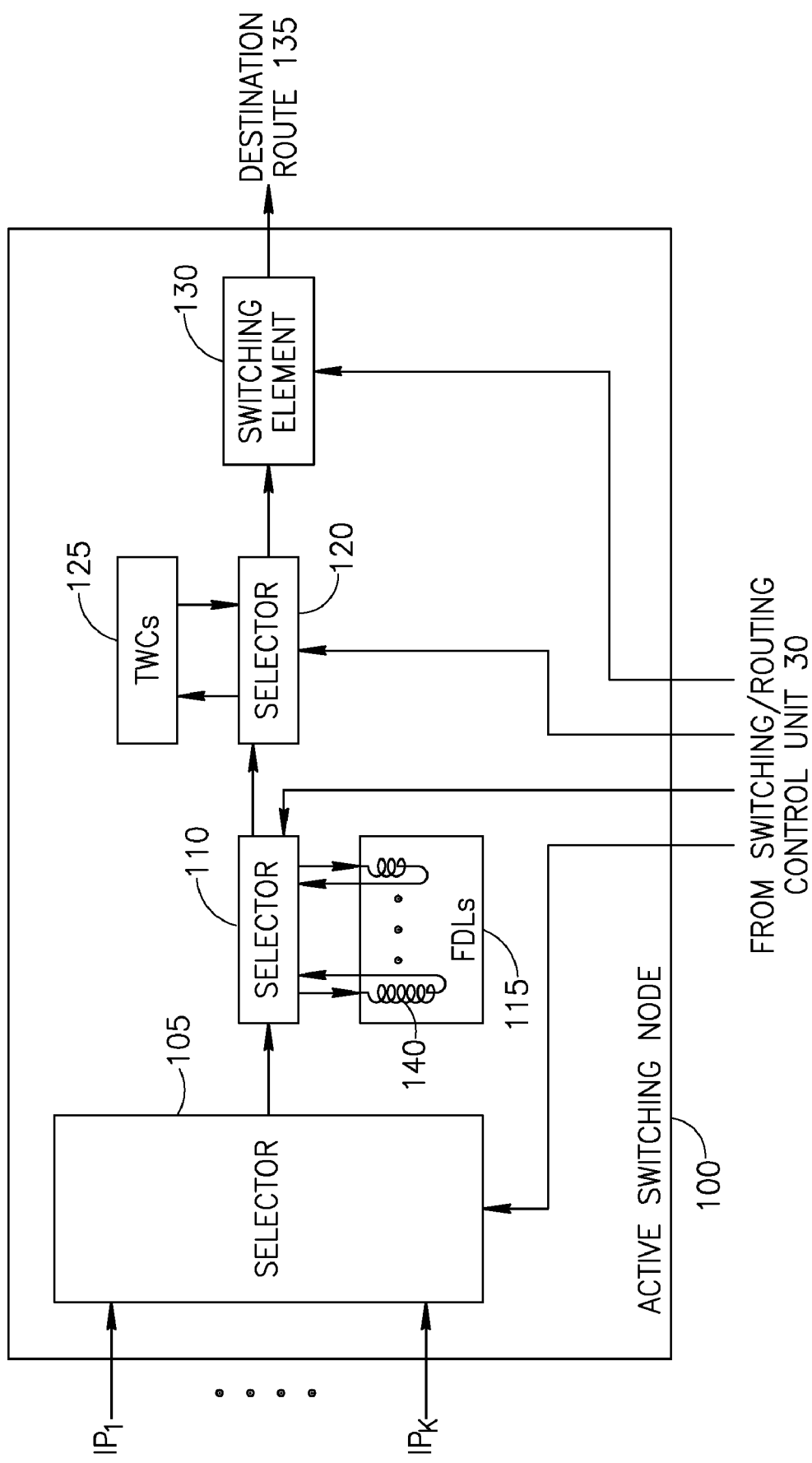
FIG. 2 is a simplified block diagram illustration of a preferred implementation of an active switching node in the optical packet switch of FIG. 1, the active switching node being constructed and operative in accordance with a preferred embodiment of the present invention.

Reference is now additionally made to FIG. 2 which is a simplified block diagram illustration of a preferred implementation of an active switching node in the optical packet switch 10 of FIG. 1, the active switching node being constructed and operative in accordance with a preferred embodiment of the present invention. For simplicity, the description below refers to one of the switching nodes 60 in FIG. 1 that is also indicated as NODE-2. NODE-2 of FIG. 1 is referred to in FIG. 2 as an active switching node 100. It is appreciated that the present invention is not limited by referring to the active switching node 100 because all the active switching nodes 60 may preferably be similar in structure and functionality.

The active switching node 100 may preferably include the following elements: an input selector 105; a buffering selector 110; a module of fiber delay lines (FDLs) 115; a wavelength conversion selector 120; a module of tunable wavelength converters (TWCs) 125; and a switching element 130.

It is appreciated that the selectors 105, 110 and 120 may each include a conventional mechanical switch that physically moves a light directing element such as a piece of a fiber optic cable or a mirror (both not shown), thereby selecting an optical path for passage of incoming optical packets. The selectors 105, 110 and 120 may, for example, be embodied in a single selector element (not shown). Preferably, the switching/routing control unit 30 controls operation of the selectors 105, 110 and 120.

When an optical packet is inputted to the input selector 105 via one of a plurality of input paths $IP_1, \ldots, IP_k$ where k is an integer, the active switching node 100 may preferably either route the optical packet to a destination route 135 without altering the optical packet, or alter the optical packet before routing to the destination route 135. In a case where the optical packet inputted at the input selector 105 is not altered by the active switching node 100, the selectors 105, 110, and 120 may preferably be arranged in a configuration that directly provides the optical packet to the switching element 130. The switching element 130 may then route the optical packet to the destination route 135.

In a case where the optical packet inputted to the input selector 105 is altered by the active switching node 100, the active switching node 100 may perform at least one of the following operations on the optical packet: delay the optical packet; and convert a channel wavelength over which the optical packet is carried.

In order to delay the optical packet, the selector 105 may preferably provide the optical packet to the selector 110 that may preferably select an FDL in the module of FDLs 115, such as an FDL 140, and direct the optical packet to the FDL 140. The FDL 140 delays the optical packet and outputs a delayed optical packet to the selector 120 via the selector 110.

In order to convert a channel wavelength over which the optical packet is carried the optical packet may be provided to the selector 120, either without delaying the optical packet beforehand or after delaying the optical packet. The selector 120 may preferably select a TWC (not shown) in the module of TWCs 125. Then, the optical packet is directed to the selected TWC that is preferably operative to convert the channel wavelength over which the optical packet is carried to a new channel wavelength thereby providing an optical packet carried over the new channel wavelength. The optical packet carried over the new channel wavelength is then preferably provided to the switching element 130 via the selector 120.

In operation, the active switching node 100 receives a plurality of optical packets carried over a plurality of channel wavelengths for switching to the destination route 135. By way of example, and without limiting the generality of the present invention, the description below refers to a case in which the active switching node 100 receives via input paths $IP_1$ and $IP_2$ two optical packets $A_1$ and $A_2$ that are carried over channel wavelengths $\lambda_1$ and $\lambda_2$ respectively.

Preferably, the switching/routing control unit 30 determines whether $A_1$ and $A_2$ contend for bandwidth. If $A_1$ and $A_2$ do not contend for bandwidth and it is required to output $A_1$ and $A_2$ at separate time slots over a single channel wavelength such as $\lambda_1$, the switching/routing control unit 30 may preferably arrange the selectors 105, 110 and 120 in a configuration that provides $A_1$ unaltered to the switching element 130, and $A_2$ to the module of TWCs 125. In the module of TWCs 125, the channel wavelength $\lambda_2$ over which $A_2$ is carried is changed to $\lambda_1$. Then, $A_2$, carried over $\lambda_1$, is provided to the switching element 130 via the selector 120. The switching element 130 preferably combines $A_1$ and $A_2$ and outputs $A_1$ and $A_2$ at separate time slots over $\lambda_1$.

If $A_1$ and $A_2$ contend for bandwidth and it is required to output $A_1$ and $A_2$ at separate time slots over $\lambda_1$, the switching/routing control unit 30 may preferably arrange the selectors 105, 110 and 120 in a configuration that provides $A_1$ unaltered to the switching element 130, and $A_2$ to the module of FDLs 115. In the module of FDLs 115, $A_2$ is delayed thereby providing a delayed $A_2$. The delayed $A_2$ is then provided to the module of TWCs 125 in which the channel wavelength $\lambda_2$ over which the delayed $A_2$ is carried is changed to $\lambda_1$. Then, the delayed $A_2$, carried over $\lambda_1$, is provided to the switching element 130. The switching element 130 preferably combines $A_1$ and the delayed $A_2$ at separate time slots over $\lambda_1$.

It is appreciated that in a case where $A_1$ and $A_2$ are provided to the active switching node 100 via $IP_1$ and $IP_2$ over similar channel wavelengths, channel wavelength conversion in the module of TWCs 125 is not required for outputting $A_1$ and $A_2$ at separate time slots over a single channel wavelength.

In a case where $A_1$ and $A_2$ may be outputted over different channel wavelengths, $A_1$ and $A_2$ may be provided unaltered to the switching element 130, and the switching element 130 may preferably output $A_1$ and $A_2$ over the different channel wavelengths.

Thus, optical packets arriving at the switching element 130 and switched thereby may include at least one of the following types: an unaltered optical packet; a delayed optical packet; an optical packet carried over a converted channel wavelength; and a delayed optical packet that is carried over a converted channel wavelength. It is appreciated that a magnitude of a delay by which an optical packet is delayed, as well as a channel wavelength over which the optical packet is outputted from the switching element 130, may preferably be determined by the switching/routing control unit 30 through configuration of the selectors 105, 110 and 125.

Figure 3:
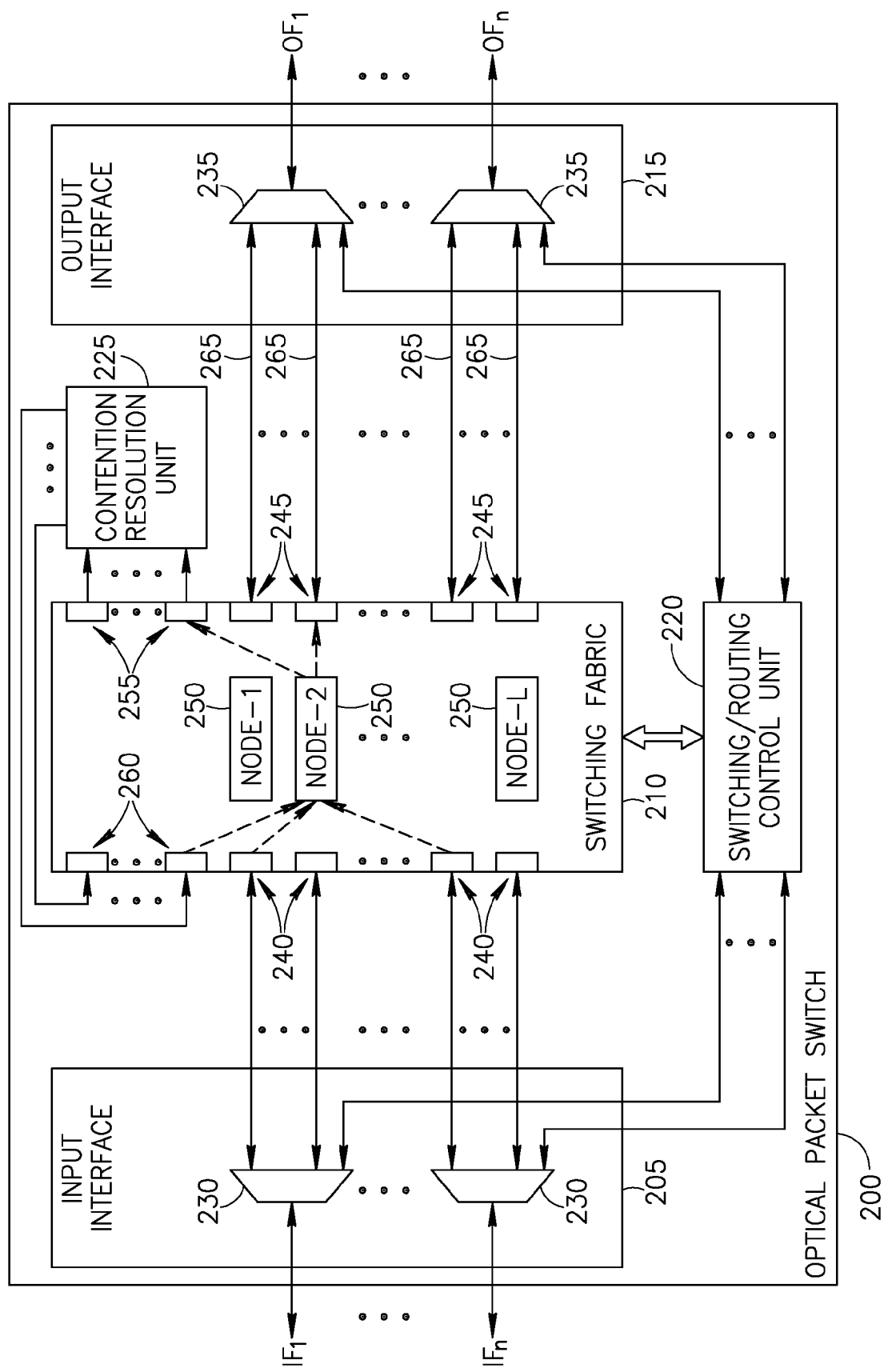
FIG. 3 is a simplified block diagram illustration of a preferred implementation of an optical packet switch having passive switching nodes, the optical packet switch being constructed and operative in accordance with a preferred embodiment of the present invention.

Reference is now made to FIG. 3 which is a simplified block diagram illustration of a preferred implementation of an optical packet switch 200 having passive switching nodes, the optical packet switch 200 being constructed and operative in accordance with a preferred embodiment of the present invention.

The optical packet switch 200 preferably includes the following elements: an input interface 205; a switching fabric 210; an output interface 215; a switching/routing control unit 220; and a contention resolution unit 225. It is appreciated that the optical packet switch 200 may be embodied in a single integrated element (not shown).

The input interface 205 may preferably be similar in structure and functionality to the input interface 15 of FIG. 1 and may include n demultiplexers 230 that receive optical packets from a plurality of incoming fibers $IF_1, \ldots, IF_n$. The n demultiplexers 230 may preferably be similar in structure and functionality to the n demultiplexers 35 of FIG. 1. The output interface 215 may preferably be similar in structure and functionality to the output interface 25 of FIG. 1 and may include n multiplexers 235 that output multiplexed optical packets to n outgoing fibers $OF_1, \ldots, OF_n$. The n multiplexers 235 may preferably be similar in structure and functionality to the n multiplexers 65 of FIG. 1.

The switching fabric 210 preferably includes the following elements: a plurality of input ports 240; a plurality of output ports 245; a plurality of passive switching nodes 250 such as L passive switching nodes; a plurality of input ports 255 via which optical signals are inputted to the contention resolution unit 225; and a plurality of output ports 260 via which optical signals are outputted from the contention resolution unit 225.

The passive switching nodes 250 depicted in FIG. 3 are arranged in a single stage configuration of switching nodes but it is appreciated that the present invention is not limited to the configuration depicted in FIG. 1. Rather, the switching fabric 210 may be replaced by a multi-stage switching fabric (not shown), or alternatively by a switching fabric (not shown) in which there are only input/output ports that serve as switching nodes that receive optical packets and output switched optical packets.

The contention resolution unit 225 may preferably include a plurality of conventional TWCs and a plurality of conventional FDLs connected, for example, in series as is well known in the art, for example, from the WASPNET architecture described in the above mentioned article of Hunter et al in *IEEE Communications Magazine*, September 2000 the disclosure of which is incorporated herein by reference.

The switching/routing control unit 220 preferably processes control information received thereat from the input interface 205 and generates control settings that are used to control routing of optical packets from the input ports 240 to the output ports 245 through the passive switching nodes 250. The control settings generated by the switching/routing control unit 220 are different than the control settings generated by the switching/routing control unit 30 of FIG. 1 because the switching fabric 210 and the switching fabric 20 of FIG. 1 operate differently as described below.

In operation, the optical packet switch 200 receives optical packets at the input interface 205 and provides the optical packets to the switching fabric 210 and control information including optical packets and headers of optical packets to the switching/routing control unit 220. Since the switching nodes 250 are passive, the switching/routing control unit 220 preferably configures the passive switching nodes 250 in a configuration which allows optical packets that need not be altered to be directly fed to the output interface 215, and optical packets that must be altered to be directed to the contention resolution unit 225 via at least one of the input ports 255. It is appreciated that alteration of an optical packet may include conversion of a channel wavelength over which the optical packet is conveyed and/or delay of the optical packet.

At the contention resolution unit 225, channel wavelengths of optical packets are preferably converted as necessary and optical packets are preferably delayed as necessary as is well known in the art. It is appreciated that channel wavelength conversion operations and delay operations are preferably performed in the contention resolution unit 225 under control of the switching/routing control unit 220 or a controller (not shown) in the contention resolution unit 225.

After performing necessary channel wavelength conversion operations and delay operations, the contention resolution unit 225 preferably outputs optical packets that do not contend for bandwidth to the passive switching nodes 250 via the output ports 260. The passive switching nodes 250 preferably direct optical packets received from the contention resolution unit 225 to the output interface 215 under control of the switching/routing control unit 220.

Thus, the passive switching nodes 250 only direct optical packets to the output interface 215 or the contention resolution unit 225 without performing operations on the optical packets that alter the optical packets. Preferably, operations that alter the optical packets are performed in the contention resolution unit 225 under control of the switching/routing control unit 220.

It is appreciated that the switching/routing control unit 220 may preferably be programmed in a pre-selected switching configuration that determines directing of optical packets by the switching nodes 250 and operations to be performed on optical packets by the contention resolution unit 225. Alternatively, the pre-selected switching configuration may be replaced by a configuration determined substantially in real-time or a configuration programmed by a processor (not shown) that may be embodied in the switching/routing control unit 220 or external thereof.

Preferably, each passive switching node 250 may receive optical packets from more than one input port 240 over more than one channel wavelength. Each switching node 250 may thus output optical packets originating from different incoming fibers and originally carried over different channel wavelengths. Each switching node 250 preferably outputs the optical packets to one or more of the plurality of output ports 245 over a plurality of output paths 265 that are ultimately associated with one or more destinations via one of the outgoing fibers $OF_1, \ldots, OF_n$.

It is appreciated that the optical packet switch 200 may preferably operate in half-duplex or full duplex communication. In such a case, optical packets may be inputted to the optical packet switch 200 either via $IF_1, \ldots, IF_n$, or $OF_1, \ldots, OF_n$ and outputted via $OF_1, \ldots, OF_n$ or $IF_1, \ldots, IF_n$ respectively by following similar tracks in the optical packet switch 200 but in opposite directions.

The apparatus of FIGS. 1-3 may preferably switch either fixed-length optical packets or variable-length optical packets that are also referred to as bursts, and even both fixed-length optical packets and bursts. The ability to switch fixed-length optical packets and/or bursts depends mainly on the way optical packets are processed by the switching/routing control units 30 and 220. The structure and functionality of the switching/routing control units 30 and 220 may therefore differ depending on the type of optical packets switched thereby.

For example, if the switching/routing control units 30 and 220 operate on fixed-length optical packets, each of the switching/routing control units 30 and 220 may preferably perform synchronization operations to synchronize incoming optical packets and header rewriting operations to rewrite headers of outgoing optical packets as is well known in the art, for example, from the KEOPS architecture described in the above mentioned articles of Hunter et al and Listanti et al in *IEEE Communications Magazine*, September 2000 the disclosures of which are incorporated herein by reference. It is appreciated that at least some of the synchronization operations may be performed in the input interfaces 15 and 205 rather than in the switching/routing control units 30 and 220 respectively, and at least some of the header rewriting operations may be performed in the output interfaces 25 and 215 rather than in the switching/routing control units 30 and 220 respectively.

If the switching/routing control units 30 and 220 operate on bursts, each of the switching/routing control units 30 and 220 may preferably perform scheduling and buffering operations on burst control packets (BCPs) as is well known in the art, for example, from the optical burst switching architectures described in the above mentioned articles of Qiao and Listanti et al in *IEEE Communications Magazine*, September 2000 the disclosures of which are incorporated herein by reference.

It is appreciated that if the switching/routing control units 30 and 220 operate on both fixed-length optical packets and bursts, each of the switching/routing control units 30 and 220 may preferably include elements (not shown) that are capable of performing the above mentioned synchronization operations and header rewriting operations on the fixed-length packets, and the above mentioned scheduling and buffering operations on the BCPs.

The operation of the apparatus of FIGS. 1-3 is now briefly described by referring, without limiting the generality of the present invention, to a few examples.

A first example of the operation of the apparatus of FIGS. 1-3 is described with reference to FIGS. 4A and 4B which together constitute a simplified partly pictorial, partly block diagram illustration of a preferred mode of operation of the apparatus of FIGS. 1-3 at a single switching node level.

The term "single switching node level" is used throughout the specification and claims to describe operations that refer to a single switching node particularly when the switching node forms part of a larger system. Switching in an optical packet switch, which is also referred to as switching at an optical packet switch level, is thus composed of a plurality of switching operations, each performed at a single switching node level.

A single switching node referred to in FIGS. 4A and 4B is indicated by reference numeral 300. Preferably, the switching node 300 is controlled by a switch control unit 310 that may be one of the switching/routing control units 30 and 220.

The switching node 300 preferably switches to a destination (not shown), under control of the switch control unit 310, a first optical packet that is received at the switching node 300 on a first input path at a first bit-rate, and a second optical packet that is received at the switching node 300 on a second input path at a second bit-rate. The first optical packet and the second optical packet may preferably be produced in a network that employs an optical packet switch, such as described with reference to FIGS. 1-3, by using one of the following: Gigabit Ethernet; synchronous digital hierarchy (SDH); and synchronous optical network (SONET).

The first optical packet and the second optical packet are preferably inputted to the switching node 300 over identical channel wavelengths, for example $\lambda_1$. It is appreciated that $\lambda_1$ is preferably a channel wavelength that is utilized by the apparatus of FIGS. 1-3 and is suitable for conveying optical communication signals. For example, $\lambda_1$ may be a channel wavelength in a wavelength band of the order of tens nanometer (nm) around one of the following wavelengths: 780 nm; 980 nm; 1310 nm; 1480 nm; 1510 nm; 1550 nm; and 1620 nm.

Preferably, the switch control unit 310 determines a magnitude of a difference between the first bit-rate and the second bit-rate. Then, if the magnitude of the difference between the first bit-rate and the second bit-rate exceeds a bit-rate difference threshold, the switching node 300 may preferably route the first optical packet to the destination over $\lambda_1$ and the second optical packet to the destination over a second channel wavelength $\lambda_2$ as shown in FIG. 4A. It is appreciated that although $\lambda_2$, is preferably different from $\lambda_1$, $\lambda_2$ may also be a channel wavelength in one of the wavelength bands mentioned above, and even in the same wavelength band as $\lambda_1$.

If the magnitude of the difference between the first bit-rate and the second bit-rate does not exceed the bit-rate difference threshold, the switching node 300 preferably routes the first optical packet and the second optical packet to the destination at separate time slots over a single channel wavelength as shown in FIG. 4B. The single channel wavelength over which the first optical packet and the second optical packet are routed to the destination may preferably be $\lambda_1$ or $\lambda_2$, or alternatively another channel wavelength of choice (not shown) in a wavelength band utilized by the apparatus of FIGS. 1-3.

Preferably, the bit-rate difference threshold is about zero so that the single channel wavelength carries optical packets that are provided at substantially similar bit rates. Thus, transmission of combinations of optical packets that are provided at bit rates that are substantially different from each other over the same channel wavelength is avoided thereby eliminating the problem encountered with switching of optical packets that are carried over optical paths at different bit-rates that is mentioned above. If the bit-rate difference threshold is selected to have a value other than about zero, the problem of switching optical packets that are carried over optical paths at different bit-rates is only partially solved.

In FIG. 4A, the first bit-rate is 10 gigabit per second (Gbit/s) and the second bit-rate is 2.5 Gbit/s by way of example. For a bit-rate difference threshold that is selected to be about zero, the magnitude of the difference between the first bit-rate and the second bit-rate, which is 7.5 Gbit/s in the example depicted in FIG. 4A, exceeds the bit-rate difference threshold and thus the first and second optical packets are preferably separately routed to the destination, with the first optical packet being routed over $\lambda_1$, and the second optical packet being routed over $\lambda_2$.

In FIG. 4B, each of the first bit-rate and the second bit-rate is 10 Gbit/s by way of example. Therefore, the magnitude of the difference between the first bit-rate and the second bit-rate in the example depicted in FIG. 4B does not exceed the bit-rate difference threshold, and thus the first and second optical packets are preferably routed to the destination over the same channel wavelength that may preferably be $\lambda_1$. It is however appreciated that although the first and second optical packets are inputted to the switching node 300 over $\lambda_1$, the first and second optical packets may be routed to the destination over a single channel wavelength other than $\lambda_1$.

The first and second optical packets may alternatively be inputted to the switching node 300 over separate channel wavelengths, for example, $\lambda_3$ and $\lambda_4$ (both not shown in FIGS. 4A and 4B). In such a case, the first and second optical packets may still be routed to the destination over a single channel wavelength, for example $\lambda_3$, if the magnitude of the difference between the first bit-rate and the second bit-rate does not exceed the bit-rate difference threshold. If the magnitude of the difference between the first bit-rate and the second bit-rate exceeds the bit-rate difference threshold, the first and second optical packets are preferably routed to the destination over separate channel wavelengths, for example $\lambda_3$ and $\lambda_4$.

When the switching node 300 is embodied in the optical packet switch 10, the destination preferably receives optical packets outputted by the switching node 300 via the output interface 25 and at least one of the n outgoing fibers $OF_1, \ldots, OF_n$. When the switching node 300 is embodied in the optical packet switch 200, the destination preferably receives optical packets outputted by the switching node 300 via the output interface 215 and at least one of the n outgoing fibers $OF_1, \ldots, OF_n$. Since the destination is typically capable of receiving optical packets over one channel wavelength or more than one channel wavelength, both a selection to convey the first and second optical packets to the destination over a single channel wavelength, and a selection to convey the first and second optical packets to the destination over separate channel wavelengths are acceptable.

It is appreciated that the apparatus of FIGS. 1-3 preferably operate in the same manner as described above to avoid transmission of combinations of optical packets that are provided at bit rates that are substantially different from each other over the same channel wavelength in an opposite direction, that is a direction from the destination towards the switching node 300.

Furthermore, operations performed by the apparatus of FIGS. 1-3 are suitable for both fixed-length packets and bursts, and are in fact independent of the type of the first and second optical packets. Therefore, each of the first optical packet and the second optical packet may include one of the following: a fixed-length optical packet; and a variable-length optical packet.

In order to route the first and second optical packets over the single channel wavelength resolution of bandwidth contention between the first and second optical packets may be required. In such a case, if the switching node 300 is an active switching node, bandwidth contention is preferably resolved within the switching node 300, for example, by altering a channel wavelength over which one of the first and second optical packets is carried and/or delaying one of the first and second optical packets as described above with reference to FIG. 2. Alternatively, if the switching node 300 is a passive switching node, bandwidth contention may preferably be resolved by the contention resolution unit 225 as described above with reference to FIG. 3.

In order to determine the magnitude of the difference between the first bit-rate and the second bit-rate, the switch control unit 310 preferably obtains a first bit-rate identifier associated with the first optical packet and a second bit-rate identifier associated with the second optical packet. It is appreciated that the first and second bit-rate identifiers may preferably be obtained by analyzing, at the switch control unit 310 or in a processor (not shown) external to the switch control unit 310, a first header associated with the first optical packet and a second header associated with the second optical packet respectively. Then, the switch control unit 310 or the external processor preferably compares the first bit-rate identifier with the second bit-rate identifier to obtain the magnitude of the difference between the first bit-rate and the second bit-rate. It is appreciated that each of the first bit-rate identifier and the second bit-rate identifier may preferably include at least one of the following: a source identifier; a label; and an overhead byte.

A second example of the operation of the apparatus of FIGS. 1-3 is described with reference to FIG. 5 which is a simplified block diagram illustration of another preferred mode of operation of the apparatus of FIGS. 1-3 at a single switching node level.

Figure 5:
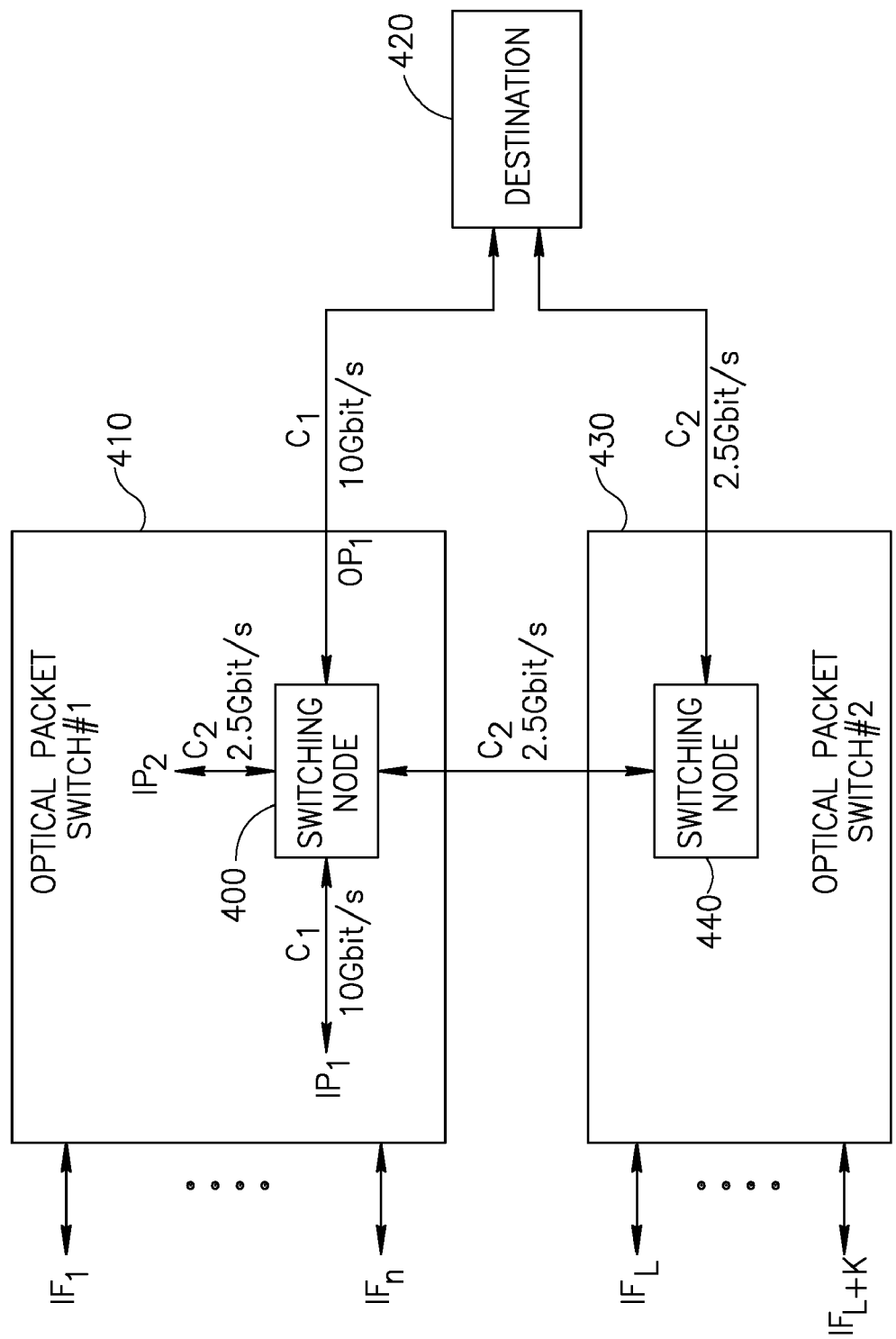
FIG. 5 is a simplified block diagram illustration of another mode of operation of the apparatus of FIGS. 1-3.

In FIG. 5, a switching node 400 in an optical packet switch 410 is preferably similar to the switching node 300 of FIGS. 4A and 4B. The optical packet switch 410 may preferably be similar to one of the optical packet switches 10 and 200.

By way of example, the switching node 400 receives a first optical packet $C_1$ on a first input path $IP_1$ at a first bit-rate and a second optical packet $C_2$ on a second input path $IP_2$ at a second bit-rate. The switching node 400 preferably operates similarly to the switching node 300 except for operations performed on the first and second optical packets when a magnitude of a difference between the first bit-rate and the second bit-rate exceeds a bit-rate difference threshold. A value of the bit-rate difference threshold may be selected as mentioned above with reference to FIGS. 4A and 4B.

Preferably, a determination that the magnitude of the difference between the first bit-rate and the second bit-rate exceeds the bit-rate difference threshold is provided by a switch control unit (not shown) that may be similar to the switch control unit 310 of FIGS. 4A and 4B. Then, in response to the determination provided by the switch control unit, the switching node 400 preferably switches $C_1$ to a destination 420 via the optical packet switch 410 and $C_2$ to the destination 420 via another optical packet switch 430.

It is appreciated that switching of the first and second optical packets to the destination 420 via the optical packet switch 430 and/or the optical packet switch 410 is independent of channel wavelengths over which the first and second optical packets are inputted to the switching node 400 and/or the optical packet switch 410. Therefore, the first optical packet and the second optical packet may be inputted to and outputted from the optical packet switches 410 and 430 over identical or different channel wavelengths.

Preferably, the optical packet switch 410 and the optical packet switch 430 may be embodied in separate optical communication switches (not shown) in a central office (CO) (not shown) of a telecommunication system (not shown), or alternatively in a single optical communication switch (not shown) in the CO. The separate optical communication switches, as well as the single optical communication switch, may preferably be adapted to switch and route optical packets at corresponding bit-rates. Additionally, each of the first optical packet and the second optical packet may preferably include a fixed-length optical packet or a burst, and the separate optical communication switches, as well as the single optical communication switch, may preferably be adapted to switch and route fixed-length optical packets or bursts respectively.

If the magnitude of the difference between the first bit-rate and the second bit-rate does not exceed the bit-rate difference threshold, the switching node 400 may preferably route $C_1$ and $C_2$ to the destination 420 on a single output path $OP_1$ without using the optical packet switch 430 as an intermediate.

In order to switch $C_2$ to the destination 420 via the optical packet switch 430, the switching node 400 preferably provides $C_2$ to a switching node 440 in the optical packet switch 430. The switching node 440 is preferably similar to the switching node 400 and is preferably operative to route $C_2$ to the destination 420.

In an opposite direction, that is a direction from the destination 420 towards the switching node 410, optical packets may be provided from the destination 420 to the optical packet switch 410 either directly or via the optical packet switch 430 depending on a magnitude of a difference between bit-rates at which the optical packets are provided.

Preferably, determination of the magnitude of the difference between the first bit-rate and the second bit-rate is obtained by using a first bit-rate identifier associated with the first optical packet and a second bit-rate identifier associated with the second optical packet in a manner as mentioned above with reference to FIGS. 4A and 4B.

In FIG. 5, the first bit-rate is 10 Gbit/s and the second bit-rate is 2.5 Gbit/s by way of example. For a bit-rate difference threshold that is selected to be about zero, the magnitude of the difference between the first bit-rate and the second bit-rate, which is 7.5 Gbit/s in the example depicted in FIG. 5, exceeds the bit-rate difference threshold and thus C1 is preferably switched to the destination 420 via the optical packet switch 410, and $C_2$ is preferably switched to the destination 420 via the optical packet switch 430.

A third example of the operation of the apparatus of FIGS. 1-3 is described with reference to FIG. 6 which is a simplified block diagram illustration of another preferred mode of operation of the apparatus of FIGS. 1-3 at a single switching node level.

Figure 6:
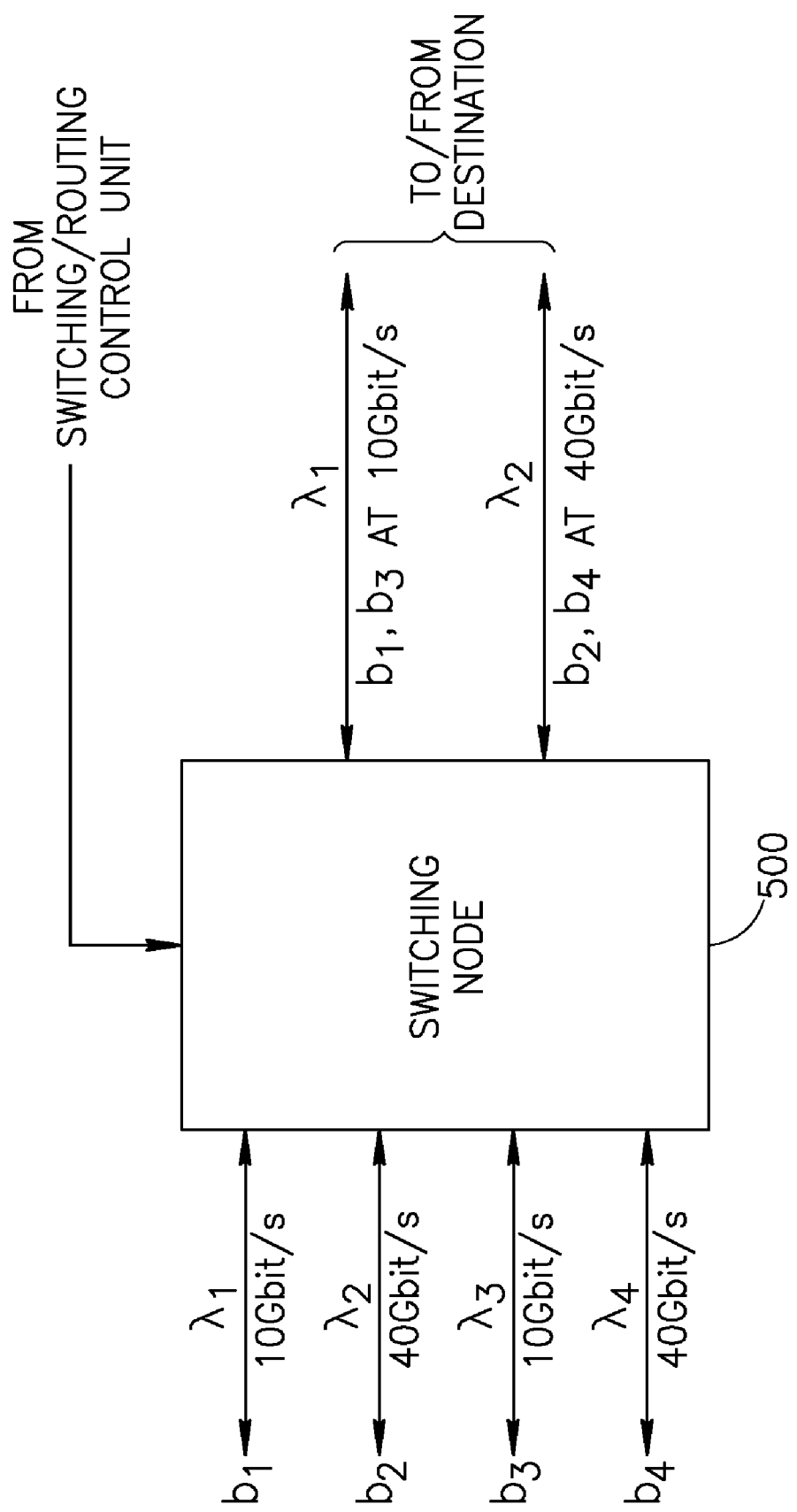
FIG. 6 is a simplified block diagram illustration of still another mode of operation of the apparatus of FIGS. 1-3.

In FIG. 6, a switching node 500 preferably switches to a destination (not shown) N series of optical packets received at the switching node 500 on N input paths at N bit-rates respectively, where N is an integer greater than two. The switching node 500 may be embodied in an optical packet switch (not shown) such as the optical packet 10 or the optical packet switch 200. Preferably, the switching node 500 is controlled by a switching/routing control unit (not shown) such as the switching/routing control unit 30 or the switching/routing control unit 220 according to a type of the optical packet switch in which the switching node 500 is embodied.

Preferably, prior to switching the N series of optical packets, the switching/routing control unit determines the N bit-rates, for example by obtaining a bit-rate identifier from a header associated with at least one optical packet in each of the N series of optical packets. The bit-rate identifier may preferably include at least one of the following: a source identifier; a label; and an overhead byte.

After determination of the N bit-rates, the switching/routing control unit preferably arranges the N series of optical packets as K groups of series of optical packets, where K is an integer such that $K \leq N$. The K groups are preferably characterized in that each group includes series of optical packets having substantially similar bit-rates, and bit-rates of series in each group differ from bit-rates of series in other groups. The switching/routing control unit also preferably allocates K separate channel wavelengths for communicating the K groups of series of optical packets to the destination. Then, the switching node 500 preferably routes optical packets in each group on a corresponding one of the K separate channel wavelengths to the destination.

By way of example, in FIG. 6 N=4, that is four series of optical packets $b_1$, $b_2$, $b_3$ and $b_4$ are inputted to the switching node 500. The first series $b_1$ is carried over a channel wavelength $\lambda_1$ at a bit-rate of 10 Gbit/s, the second series $b_2$ is carried over a channel wavelength $\lambda_2$ at a bit-rate of 40 Gbit/s, the third series $b_3$ is carried over a channel wavelength $\lambda_3$ at a bit-rate of 10 Gbit/s, and the fourth series $b_4$ is carried over a channel wavelength $\lambda_4$ at a bit-rate of 40 Gbit/s.

Preferably, after determination of the four bit-rates, the switching/routing control unit preferably arranges the four series of optical packets as two groups (K=2) of series of optical packets. A first group of series of optical packets includes the series $b_1$ and $b_3$. A second group of series of optical packets includes the series $b_2$ and $b_4$.

Preferably, the switching/routing control unit allocates two channel wavelengths, for example the channel wavelengths $\lambda_1$ and $\lambda_2$, for communication of the four series of optical packets to the destination. The switching node 500 then preferably routes to the destination optical packets in the series $b_1$ and $b_3$ at 10 Gbit/s on $\lambda_1$ and optical packets in the series $b_2$ and $b_4$ at 40 Gbit/s on $\lambda_2$.

It is appreciated that bandwidth contention among optical packets in each group may be resolved as mentioned above with reference to FIGS. 2 and 3.

In order to route $b_3$ on $\lambda_1$ and $b_4$ on $\lambda_2$ it is required to convert the channel wavelengths $\lambda_3$ and $\lambda_4$ over which the series $b_3$ and $b_4$ are provided to $\lambda_1$ and $\lambda_2$ respectively. If the switching node 500 is an active switching node, conversion of $\lambda_3$ and $\lambda_4$ to $\lambda_1$ and $\lambda_2$ respectively and routing of the optical packets to the destination may preferably be performed by the switching node 500 under control of the switching/routing control unit. It is appreciated that the switching node 500 may also perform operations to resolve bandwidth contention if bandwidth contention occurs.

If the switching node 500 is a passive switching node, conversion of $\lambda_3$ and $\lambda_4$ to $\lambda_1$ and $\lambda_2$ respectively, as well as operations to resolve bandwidth contention if bandwidth contention occurs, may preferably be performed by an external unit, such as the contention resolution unit 225. In such a case, the switching node 500 is preferably operative only to route the four series of optical packets to the destination under control of the switching/routing control unit.

It is appreciated that switching of the N series of optical packets is independent of channel wavelengths over which the N series of optical packets are inputted to the switching node 500. Thus, at least some of the channel wavelengths over which the N series of optical packets are inputted to the switching node 500 may be identical.

In an opposite direction, that is a direction from the destination towards the switching node 500, optical packets that are provided from the destination to the switching node 500 over the channel wavelengths $\lambda_1$ and $\lambda_2$ at bit-rates of 10 Gbit/s and 40 Gbit/s respectively may be separated in the switching node 500 to provide four series of optical packets that may be carried over $\lambda_1$, $\lambda_2$, $\lambda_3$ and $\lambda_4$ at bit-rates of 10 Gbit/s, 40 Gbit/s, 10 Gbit/s and 40 Gbit/s respectively.

Figure 7:
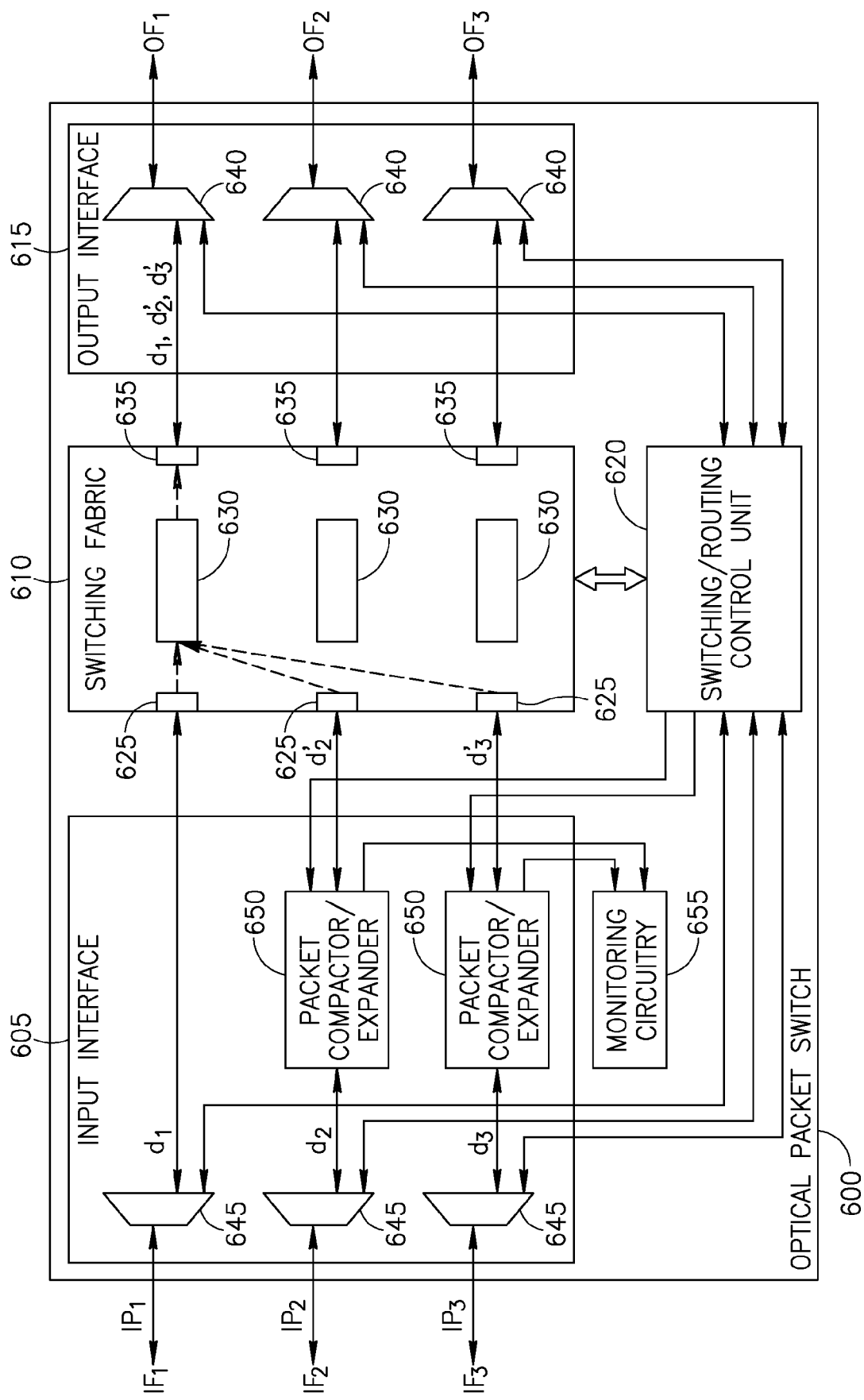
FIG. 7 is a simplified block diagram illustration of yet another mode of operation of the apparatus of FIGS. 1-3.

A fourth example of the operation of the apparatus of FIGS. 1-3 is described with reference to FIG. 7 which is a simplified block diagram illustration of another preferred mode of operation of the apparatus of FIGS. 1-3. The mode of operation in FIG. 7 is depicted at an optical packet switch level.

Preferably, an optical packet switch 600 includes the following elements: an input interface 605; a switching fabric 610; an output interface 615; and a switching/routing control unit 620. The switching fabric 610 and the output interface 615 may preferably be similar in structure and functionality to the switching fabric 20 and the output interface 25 of FIG. 1 respectively, or to the switching fabric 210 and the output interface 215 of FIG. 3 respectively.

The switching fabric 610 preferably includes a plurality of input ports 625, a plurality of switching nodes 630 and a plurality of output ports 635 that may preferably be similar in structure and functionality to the input ports 40, the switching nodes 60 and the output ports 55 of FIG. 1 respectively, or to the input ports 240, the switching nodes 250 and the output ports 245 of FIG. 3 respectively.

The output interface 615 may preferably include a plurality of optical multiplexers 640 that may be similar in structure and functionality to the optical multiplexers 65 of FIG. 1 or the optical multiplexers 235 of FIG. 3. The multiplexers 640 preferably multiplex optical packets provided by the switching fabric 610 and output multiplexed optical packets to n outgoing fibers $OF_1, \ldots, OF_n$.

The input interface 605 is preferably operatively associated with the switching/routing control unit 620 and a plurality of incoming fibers (IFs), such as n incoming fibers $IF_1, \ldots, IF_n$ where n is an integer. The n incoming fibers $IF_1, \ldots, IF_n$ are preferably respectively coupled to n optical demultiplexers 645 in the input interface 605. The optical demultiplexers 645 may be similar in structure and functionality to the optical demultiplexers 35 of FIG. 1 or the optical demultiplexers 230 of FIG. 3.

In accordance with a preferred embodiment of the present invention, the optical packet switch 600 may also include at least one packet compactor/expander 650 operatively controlled by the switching/routing control unit 620 and operative to compact/expand optical packets. The at least one packet compactor/expander 650 may preferably be comprised in the input interface 605 and operatively associated with the demultiplexers 645 and the switching fabric 610.

Alternatively, the at least one packet compactor/expander 650 may be external to the input interface 605 and operatively associated with the demultiplexers 645 and the switching fabric 610. The at least one packet compactor/expander 650 may also preferably be operatively associated with monitoring circuitry 655. The monitoring circuitry 655 may also be comprised in the optical packet switch 600 or alternatively be external to the optical packet switch 600 and in operative association therewith.

Preferably, the input interface 605 in association with the at least one packet compactor/expander 650 and the switching/routing control unit 620 may form a bit-rate balancing apparatus that may be employed to balance bit-rates of optical packets carried on a plurality of input paths provided, for example, via the n incoming fibers $IF_1, \ldots, IF_n$. Preferably, the bit-rate balancing apparatus balances the bit-rates of the optical packets with respect to each other up to a bit-rate difference level within a predetermined equalization range so as to obtain optical packets having balanced bit-rates. The optical packets having balanced bit-rates may then be provided to the switching fabric 610 for switching to an output path on a single switched channel wavelength.

For an equalization range that is of about zero range, balancing of the bit-rates of optical packets carried over the plurality of input paths preferably results in optical packets having substantially similar bit-rates. Thus, the switching fabric 610 is enabled to perform switching operations on optical packets having substantially similar bit-rates thereby eliminating the problem encountered with switching of optical packets that are carried over optical paths at different bit-rates that is mentioned above.

The operation of the optical packet switch 600 of FIG. 7 is now briefly described. Preferably, the optical packet switch 600 switches optical packets that are provided at a plurality of bit-rates on a plurality of input paths to an output path.

By way of example, in FIG. 7 three series $d_1$, $d_2$ and $d_3$ of optical packets that are provided on input paths $IP_1$, $IP_2$ and $IP_3$ via input fibers $IF_1$, $IF_2$ and $IF_3$ respectively are inputted to the input interface 605. The first series $d_1$ is carried at a bit-rate of 10 Gbit/s, the second series $d_2$ is carried at a bit-rate of 5 Gbit/s, and the third series $d_3$ is carried at a bit-rate of 2.5 Gbit/s.

The demultiplexers 645 preferably separate the series $d_1$, $d_2$ and $d_3$ from other series of optical packets (not shown) that may be carried over $IF_1$, $IF_2$ and $IF_3$, and provide control information enabling control of routing of the series $d_1$, $d_2$ and $d_3$ to the switching/routing control unit 620.

By way of example, the input interface 605 includes a total of two packet compactors/expanders 650, a first one being associated with $IF_2$ via a corresponding one of the demultiplexers 645, and a second one being associated with $IF_3$ via a corresponding one of the demultiplexers 645.

The packet compactor/expander 650 that is associated with $IF_2$ preferably compacts optical packets in $d_2$ so as to obtain a series $d'_2$ of compacted optical packets at twice the original bit-rate of 5 Gbit/s, that is at a bit-rate of 10 Gbit/s. Similarly, the packet compactor/expander 650 that is associated with $IF_3$ preferably compacts optical packets in $d_3$ so as to obtain a series $d'_3$ of compacted optical packets at four times the original bit-rate of 2.5 Gbit/s, that is at a bit-rate of 10 Gbit/s.

Preferably, the input interface 605 outputs to the switching fabric 610 the series $d_1$, $d'_2$, and $d'_3$, each being provided at a bit-rate of 10 Gbit/s. The switching fabric 610 is therefore enabled to perform switching operations on optical packets that are provided at bit-rates of 10 Gbit/s, such operations including, for example, routing $d_1$, $d'_2$, and $d'_3$ over a single switched channel wavelength via the outgoing fiber $OF_1$.

It is appreciated that the three series $d_1$, $d_2$ and $d_3$ may originally be carried over similar channel wavelengths, or alternatively over different channel wavelengths in which case channel wavelength conversions are required. If the switching nodes 630 are active switching nodes, the switching nodes 630 may perform the channel wavelength conversions. Alternatively, if the switching nodes 630 are passive switching nodes, channel wavelength conversions are preferably performed externally, for example by a contention resolution unit such as the contention resolution unit 225 of FIG. 3, and the switching nodes 630 only route the optical packets to the output path.

In an opposite direction, that is a direction towards the optical packet switch 600 via the output path, optical packets at substantially similar bit-rates may be switched by the switching fabric 610 and provided to the input interface 605. At the input interface 605, some of the optical packets may be expanded in the packet compactors/expanders 650 thereby lowering their bit-rates.

Preferably, each of the optical packets carried over $IF_1$, $IF_2$, $IF_3$ and the output path may include one of the following: a fixed-length optical packet; and a variable-length optical packet.

It is appreciated that switching of compacted optical packets is no different than switching of non-compacted optical packets and therefore switching of compacted optical packets may be performed either by active switching nodes or by passive switching nodes.

Preferably, compaction of the optical packets may be performed for optical packets that are coded in various line codes such as a return-to-zero (RZ) line code and a non-return-to-zero (NRZ) line code.

The monitoring circuitry 655 may preferably be operative to receive replicas of optical packets before compaction/expansion and replicas of compacted/expanded optical packets. Preferably, the monitoring circuitry 655 uses the replicas of optical packets provided thereto to monitor compaction/expansion of optical packets and to detect loss of optical packets and compaction/expansion errors thereby improving survivability of communication.

An example of a preferred implementation of a packet compactor/expander 650 is described with reference to FIG. 8. Preferably, the packet compactor/expander 650 includes the following elements: an input selector 700; an optical transceiver 705; a buffer 710; a clock multiplication/division unit 715; an optical transceiver 720; and an output selector 725. The selectors 700 and 725 may each include a conventional mechanical switch that physically moves a light directing element such as a piece of a fiber optic cable or a mirror (both not shown), thereby selecting an optical path for passage of incoming optical packets. The selectors 700 and 725 may, for example, be embodied in a single selector element (not shown).

The term "transceiver" is used throughout the specification and claims to include a transmitter and a receiver that may be embodied in separate units or in a combined unit. It is appreciated that each of the optical transceivers 705 and 720 may be modulated either by direct injection current modulation or by external modulation as is well known in the art.

Figure 8:
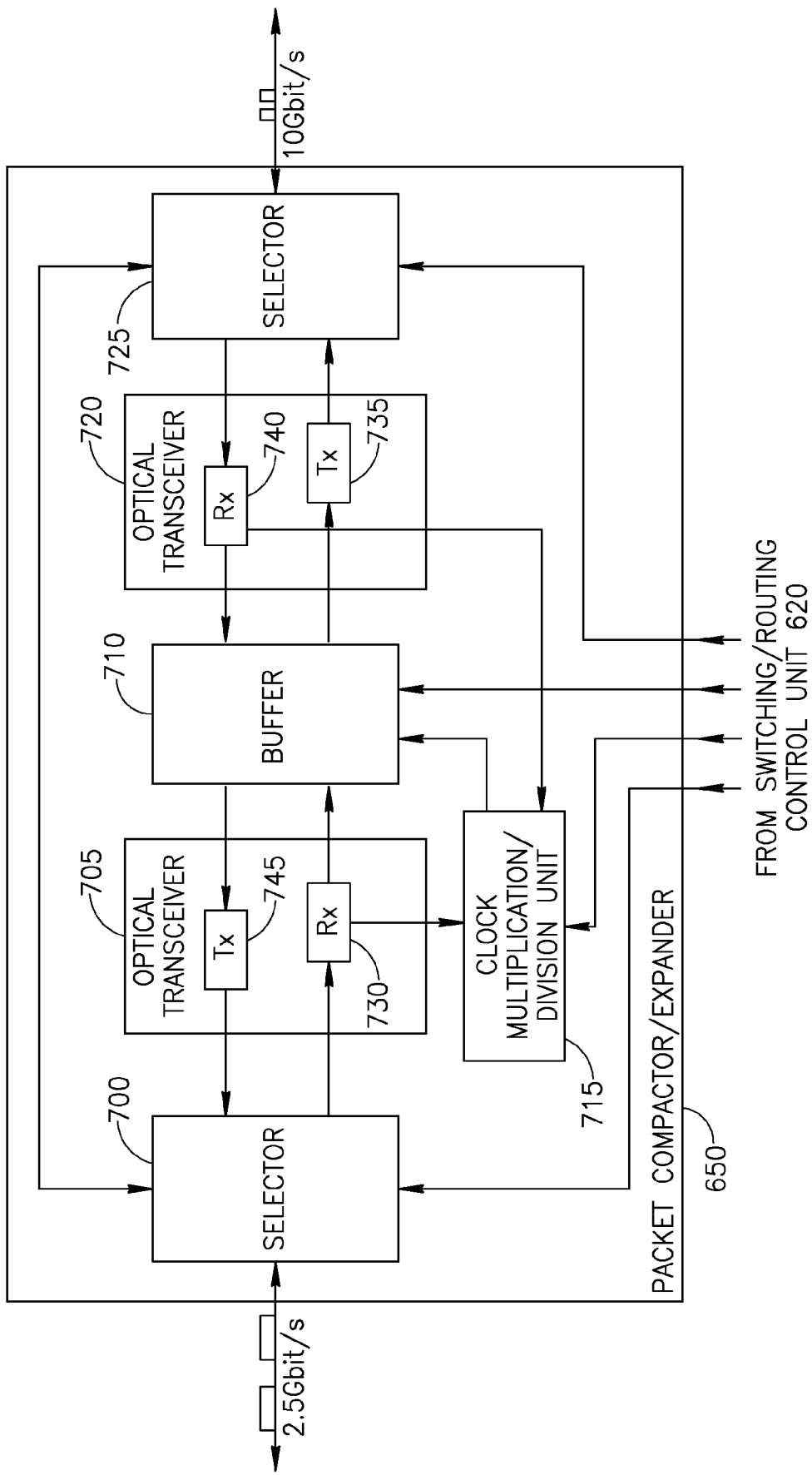
FIG. 8 is a simplified block diagram illustration of a preferred implementation of a packet compactor/expander that may be employed with the apparatus of FIGS. 1-3, the packet compactor/expander being constructed and operative in accordance with a preferred embodiment of the present invention.

The operation of the apparatus of FIG. 8 is now briefly described. Preferably, optical packets inputted to the packet compactor/expander 650 are provided to the selector 700. The optical packets are preferably provided at a first bit-rate that may be, for example, 2.5 Gbit/s.

If the optical packets received at the selector 700 do not require compaction/expansion, the selector 700 preferably directs the optical packets to the selector 725 under control of the switching/routing control unit 620 of FIG. 7, and the selector 725 preferably outputs the optical packets thereby bypassing the other elements of the packet compactor/expander 650.

If the optical packets received at the selector 700 require compaction/expansion, the selector 700 preferably directs the optical packets to an optical receiver 730 in the optical transceiver 705 under control of the switching/routing control unit 620. The optical receiver 730 converts the optical packets to electronic signals at the first bit-rate, and the clock multiplication/division unit 715 preferably extracts a clock signal from the electronic signals generated by the optical receiver 730. Then, the clock multiplication/division unit 715 preferably multiplies the clock signal by a pre-selected compaction factor that may have, for example, the value of four thereby generating a new clock signal. It is appreciated that the switching/routing control unit 620 may be operative to select the compaction factor.

In order to determine the compaction factor the switching/routing control unit 620 preferably obtains bit-rate identifiers comprised in headers associated with the optical packets. The bit-rate identifiers preferably identify the first bit-rate, and the switching/routing control unit 620 preferably divides a predetermined second bit-rate by the first bit-rate to obtain the compaction factor. The second bit-rate is preferably greater than the first bit-rate and is typically a bit-rate of optical packets for which compaction is not required. It is appreciated that the second bit-rate may be obtained from bit-rate identifiers comprised in headers associated with optical packets for which compaction is not required. In FIG. 8, the second bit-rate is 10 Gbit/s by way of example.

Preferably, the new clock signal is fed to the buffer 710 which employs the new clock and the electronic signals generated by the optical receiver 730 to output electronic signals at the second bit-rate. The electronic signals at the second bit-rate are preferably derived from the electronic signals at the first bit-rate.

Preferably, the electronic signals at the second bit-rate are employed to drive an optical transmitter 735 in the optical transceiver 720 as is well known in the art. The optical transmitter 735, driven by the electronic signals at the second bit-rate, preferably generates optical packets at the second bit-rate that are compacted with respect to the optical packets at the first bit-rate. The compact optical packets at the second bit-rate are then preferably outputted via the selector 725 and switched, ultimately, to a destination (not shown).

It is appreciated that the destination may preferably be updated of compaction operations performed on the optical packets provided at the first bit-rate. Preferably, updating of the destination of the compaction operations may be obtained by providing to the destination an indication of the compaction operations and at least one of the following: the compaction factor; and the first bit-rate. Additionally, a replica of at least one of the following may be routed to the monitoring circuitry 655 of FIG. 7: the optical packets provided at the first bit-rate; and the compact optical packets.

The packet compactor/expander 650 may also be operative to expand compacted optical packets. Expansion of compacted optical packets may preferably be performed similarly to compaction of optical packets except that a clock signal of the compacted optical packets that may be obtained by the clock multiplication/division unit 715 is preferably divided by an expansion factor rather than multiplied by a compaction factor.

In an opposite direction, optical packets received at the selector 725 at a third bit-rate are preferably directed to the selector 700 if the optical packets do not require compaction/expansion. The selector 700 preferably outputs the optical packets thereby bypassing the other elements of the packet compactor/expander 650.

If the optical packets received at the selector 725 require compaction/expansion, the selector 725 preferably directs the optical packets to an optical receiver 740 in the optical transceiver 720 under control of the switching/routing control unit 620. The optical receiver 740 converts the optical packets received thereat to electronic signals, and the clock multiplication/division unit 715 preferably extracts a clock signal from the electronic signals generated by the optical receiver 740.

Preferably, the clock multiplication/division unit 715 generates a new clock signal by dividing the clock signal by a factor if expansion of the optical packets is required, or by multiplying the clock signal by a factor if compaction of the optical packets is required. The new clock signal is then fed to the buffer 710 which employs the new clock and the electronic signals generated by the optical receiver 740 to output electronic signals at a fourth bit-rate that correspond to the electronic signal at the third bit-rate. The electronic signals at the fourth bit-rate are preferably employed to drive an optical transmitter 745 in the optical transceiver 705 thereby generating compacted/expanded optical packets at the fourth bit-rate. The compacted/expanded optical packets at the fourth bit-rate are then preferably outputted via the selector 700.

Preferably, each of the optical packets inputted to and outputted from the packet compactor/expander 650 may include one of the following: a fixed-length optical packet; and a variable-length optical packet.

It is appreciated that compaction and expansion of optical packets as mentioned above are preferably independent of a line code by which the optical packets are coded. Therefore, such compaction and expansion of optical packets may preferably be performed on optical packets that are coded in various line codes such as an RZ line code and an NRZ line code. Furthermore, the compaction and expansion of the optical packets are independent of a channel wavelength over which the optical packets are carried. Therefore, the optical packets may be inputted to and outputted from the packet compactor/expander 650 over any channel wavelength of choice.

Preferably, compaction and expansion of optical packets as mentioned above may also be employed for resolving bandwidth contention between a first optical packet $P_1$ carried over a channel wavelength $\lambda_1$ and arriving on a first path and a second optical packet $P_2$ carried over $\lambda_1$ and arriving on a second path. An example of a preferred mode of operation of the apparatus of FIGS. 1-3 in which compaction and expansion of optical packets are used for resolving bandwidth contention is described with reference to FIGS. 9A and 9B. The mode of operation in FIGS. 9A and 9B is depicted at a single switching node level. A single switching node referred to in FIGS. 9A and 9B is indicated by reference numeral 800. The switching node 800 is preferably controlled by a switching/routing control unit (not shown) that may be, for example, one of the switching/routing control units 30 and 220.

Preferably, when $P_1$ and $P_2$ contend for bandwidth, the switching/routing control unit detects bandwidth contention and checks whether the bandwidth contention can be resolved by compaction of at least one of $P_1$ and $P_2$.

FIG. 9A shows an example in which $P_1$ and $P_2$ overlap in such a way that bandwidth contention cannot be resolved by compaction of any of the first optical packet and the second optical packet. Therefore, in the example shown in FIG. 9A the bandwidth contention must be resolved by other means, for example by using a bandwidth contention resolution unit (not shown) such as the contention resolution unit 225. The bandwidth contention resolution unit may delay at least one of $P_1$ and $P_2$ and/or change a channel wavelength over which at least one of $P_1$ and $P_2$ is carried.

If the bandwidth contention can be resolved by compaction of at least one of $P_1$ and $P_2$, an example of which is shown in FIG. 9B, the switching/routing control unit preferably determines that the bandwidth contention can be resolved by compaction of at least one of $P_1$ and $P_2$ and computes a compaction factor by which the at least one of $P_1$ and $P_2$ must be compacted.

In the example shown in FIG. 9B only $P_1$ must be compacted in order to resolve the bandwidth contention. Therefore, $P_1$ is preferably fed to a packet compactor/expander 810 that may be similar in structure and functionality to the packet compactor/expander 650 of FIG. 8. Then, $P_1$ is compacted by the packet compactor/expander 810, preferably under control of the switching/routing control unit, so as to obtain a compacted first optical packet $P'_1$.

It is appreciated that if the compactor/expander 810 preserves a time delay between $P_1$ and $P_2$, it is sufficient to compact only one of $P_1$ and $P_2$. However, if the compactor/expander 810 does not preserve the time delay between $P_1$ and $P_2$, compaction of $P_2$ to obtain a compacted second optical packet $P'_2$ may additionally be required. It is appreciated that in a case where compaction of both $P_1$ and $P_2$ is required, $P_1$ and $P_2$ may be compacted, for example, by the same compaction factor. Alternatively, $P_1$ and $P_2$ may be compacted by different compaction factors.

In the example shown in FIG. 9B, $P'_1$ and $P_2$ do not overlap in time and therefore $P'_1$ and $P_2$ do not contend for bandwidth. Thus, when $P'_1$ and $P_2$, that are carried over $\lambda_1$, are inputted to the switching node 800, the switching node 800 may preferably switch $P'_1$ and $P_2$ to a destination (not shown) on a single switched channel wavelength such as $\lambda_1$.

Preferably, the destination may be updated of compaction operations performed on any of $P_1$ and $P_2$. It is appreciated that updating of the destination of the compaction operations may be obtained by providing to the destination an indication of the compaction operations and at least one the following: the compaction factor; a bit-rate of $P_1$; and a bit-rate of $P_2$. Preferably, the bit-rate of $P_1$ and the bit-rate of $P_2$ may be obtained from bit-rate identifiers in headers of $P_1$ and $P_2$.

Preferably, the switching node 800 may route to monitoring circuitry (not shown), that may be similar in structure and functionality to the monitoring circuitry 655 of FIG. 7, a replica of at least one of the following: $P_1$; $P_2$; $P'_1$; and $P'_2$ in a case where $P'_2$ is generated. The monitoring circuitry may preferably employ the replicas provided thereto to monitor compaction/expansion of optical packets and to detect loss of optical packets and compaction/expansion errors thereby improving survivability of communication.

In an opposite direction, that is a direction from the destination towards the switching node 800, compacted optical packets that are provided on a single switched channel wavelength may preferably be separated by the switching node 800 and expanded in the packet compactor/expander 810.

Preferably, each of $P_1$ and $P_2$, and accordingly also $P'_1$ and $P'_2$ if generated, may include one of the following: a fixed-length optical packet; and a variable-length optical packet.

It is appreciated that switching of compacted optical packets is no different than switching of non-compacted optical packets and therefore the switching node 800 may be either an active switching node or a passive switching node.

Preferably, each of $P_1$ and $P_2$, and accordingly also $P'_1$ and $P'_2$ if generated, may be coded by a line code, such as an RZ line code or an NRZ line code.

In accordance with another preferred embodiment of the present invention bandwidth contention between optical packets may be resolved by employing alternative apparatus and method. An example of a preferred implementation of a polarizing apparatus 900 that may be used at a single switching node level to resolve bandwidth contention is described with reference to FIG. 10. The polarizing apparatus 900 may replace any one of the switching nodes 60 in the optical packet switch 10 of FIG. 1 or be embodied in any one of the switching nodes 60. Alternatively, the polarizing apparatus 900 may replace elements of the contention resolution unit 225 of FIG. 3 that resolve bandwidth contention that occurs at a single switching node 250 and be embodied in the contention resolution unit 225.

The polarizing apparatus 900 may preferably be controlled by a switching/routing control unit (not shown) such as one of the switching/routing control units 30 and 220.

Preferably, the polarizing apparatus 900 includes the following elements: selectors 910; polarizers 920; a combiner 930; and optical amplifiers 940. Each of the number of selectors and the number of polarizers is preferably determined according to a number of input paths over which optical packets are inputted to the polarizing apparatus 900. It is appreciated that the selectors 910 may, for example, be embodied in a single selector element (not shown), and the polarizers 920 may, for example, be embodied in a single polarization element (not shown).

Figure 10:
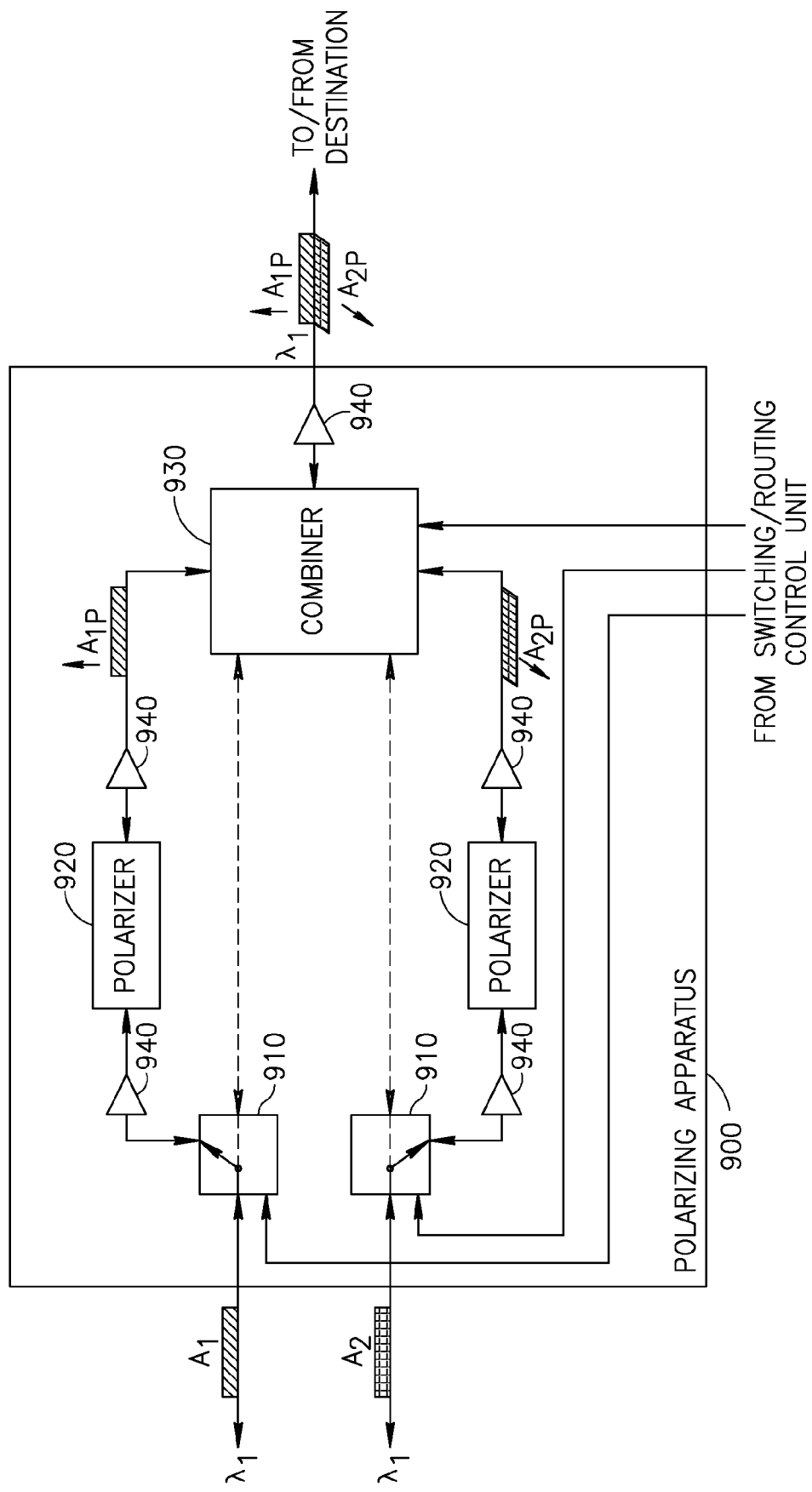
FIG. 10 is a simplified block diagram illustration of a preferred implementation of a polarizing apparatus that may be employed with the apparatus of FIGS. 1-3, the polarizing apparatus being constructed and operative in accordance with a preferred embodiment of the present invention.

In the example shown in FIG. 10, a first optical packet $A_1$ that arrives on a first path and a second optical packet $A_2$ that arrives on a second path are inputted to the polarizing apparatus 900, and the polarizing apparatus 900 includes two selectors 910 and two polarizers 920.

The operation of the apparatus of FIG. 10 is now briefly described.

In a case where $A_1$ and $A_2$ do not contend for bandwidth, the selectors 910 preferably direct $A_1$ and $A_2$ to the combiner 930 that preferably switches $A_1$ and $A_2$ in a combined form to a destination (not shown) on a single switched channel wavelength as is well known in the art.

In a case where $A_1$ and $A_2$ contend for bandwidth, the selectors 910 preferably direct $A_1$ and $A_2$ to corresponding polarizers 920. The polarizer 920 that receives $A_1$ preferably polarizes $A_1$ in a first polarization direction to obtain a first polarized optical packet $A_{1P}$, and the polarizer 920 that receives $A_2$ preferably polarizes $A_2$ in a second polarization direction to obtain a second polarized optical packet $A_{2P}$. The first polarization direction and the second polarization direction are preferably, but not necessarily, orthogonal.

Preferably, $A_{1P}$ and $A_{2P}$ are provided to the combiner 930. Since $A_{1P}$ and $A_{2P}$ are polarized in different polarization directions, which are preferably orthogonal, the combiner 930 may preferably merge $A_{1P}$ and $A_{2P}$ onto a single switched channel wavelength $\lambda_1$ and route $A_{1P}$ and $A_{2P}$ to the destination over $\lambda_1$.

The optical amplifiers 940 may preferably be used to amplify $A_1$ and $A_2$ before input to the polarizers 920, and to amplify $A_{1P}$ and $A_{2P}$ prior to merging by the combiner 940 and after merging by the combiner 940.

In an opposite direction, that is a direction from the destination towards the polarizing apparatus 900, merged polarized optical packets that are provided on a single switched channel wavelength may preferably be separated by the polarizing apparatus 900 and routed over separate paths in a polarized form.

Preferably, each of $A_1$ and $A_2$, and accordingly also $A_{1P}$ and $A_{2P}$ may include one of the following: a fixed-length optical packet; and a variable-length optical packet. Further preferably, each of $A_1$, $A_2$, $A_{1P}$ and $A_{2P}$ may be coded by a line code, such as an RZ line code or an NRZ line code.

Figure 11:
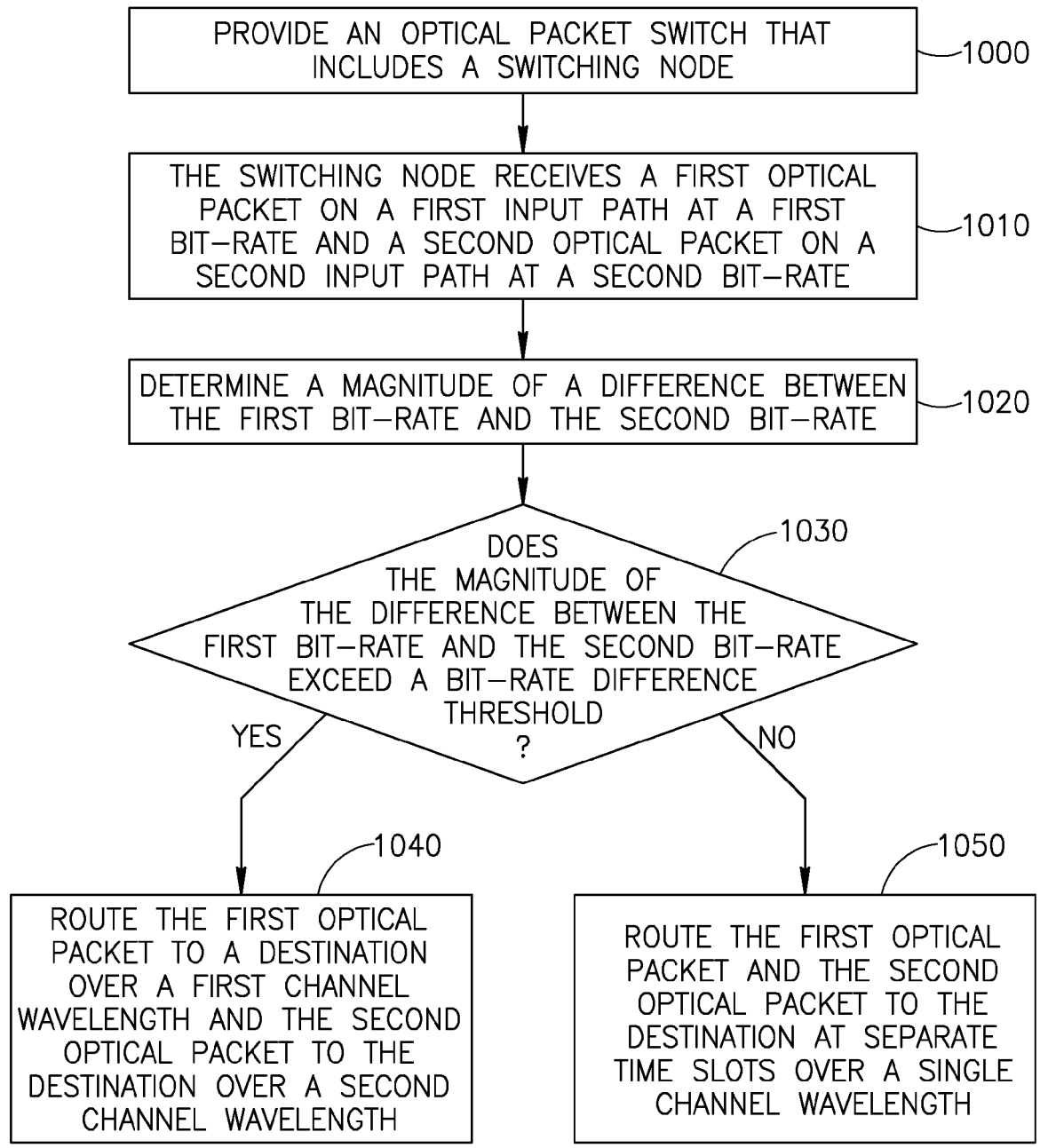
FIG. 11 is a simplified flowchart illustration of a preferred method of operation of the apparatus of FIGS. 1-3.

Reference is now made to FIG. 11 which is a simplified flowchart illustration of a preferred method of operation of the apparatus of FIGS. 1-3.

An optical packet switch that includes a switching node is preferably provided (step 1000). The switching node preferably receives a first optical packet on a first input path at a first bit-rate and a second optical packet on a second input path at a second bit-rate (step 1010). Then, a magnitude of a difference between the first bit-rate and the second bit-rate is determined (step 1020).

Preferably, in accordance with a determination of the magnitude of the difference between the first bit-rate and the second bit-rate (step 1030), the switching node routes the first optical packet to a destination over a first channel wavelength and the second optical packet to the destination over a second channel wavelength (step 1040) if the magnitude of the difference between the first bit-rate and the second bit-rate exceeds a bit-rate difference threshold, and routes the first optical packet and the second optical packet to the destination at separate time slots over a single channel wavelength (step 1050) if the magnitude of the difference between the first bit-rate and the second bit-rate does not exceed the bit-rate difference threshold.

Figure 12:
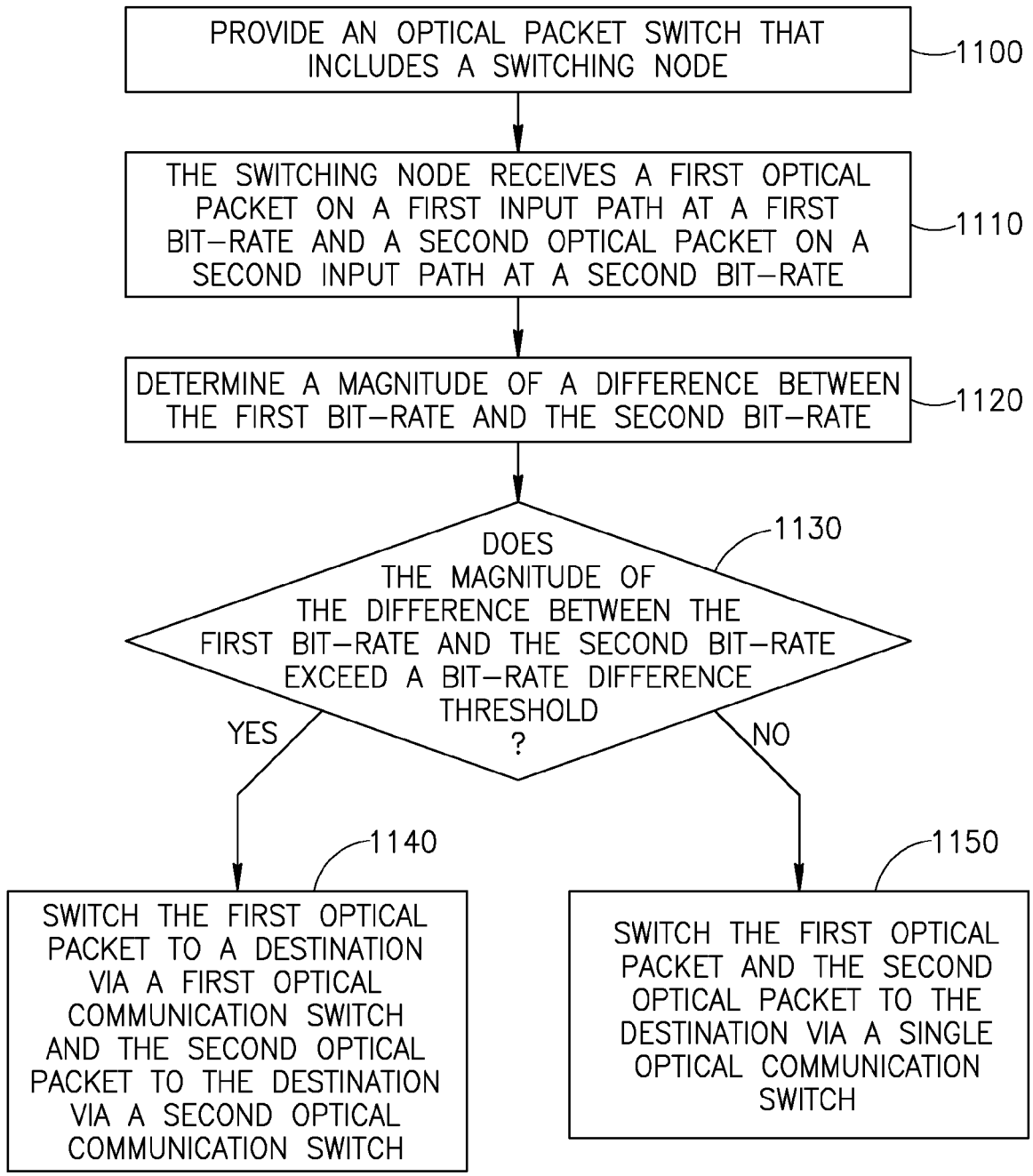
FIG. 12 is a simplified flowchart illustration of another preferred method of operation of the apparatus of FIGS. 1-3.

Reference is now made to FIG. 12 which is a simplified flowchart illustration of another preferred method of operation of the apparatus of FIGS. 1-3.

An optical packet switch that includes a switching node is preferably provided (step 1100). The switching node preferably receives a first optical packet on a first input path at a first bit-rate and a second optical packet on a second input path at a second bit-rate (step 1110). Then, a magnitude of a difference between the first bit-rate and the second bit-rate is determined (step 1120).

Preferably, in accordance with a determination of the magnitude of the difference between the first bit-rate and the second bit-rate (step 1130), the switching node switches the first optical packet to a destination via a first optical communication switch and the second optical packet to the destination via a second optical communication switch (step 1140) if the magnitude of the difference between the first bit-rate and the second bit-rate exceeds a bit-rate difference threshold, and switches the first optical packet and the second optical packet to the destination via a single optical communication switch (step 1150) if the magnitude of the difference between the first bit-rate and the second bit-rate does not exceed the bit-rate difference threshold.

Figure 13:
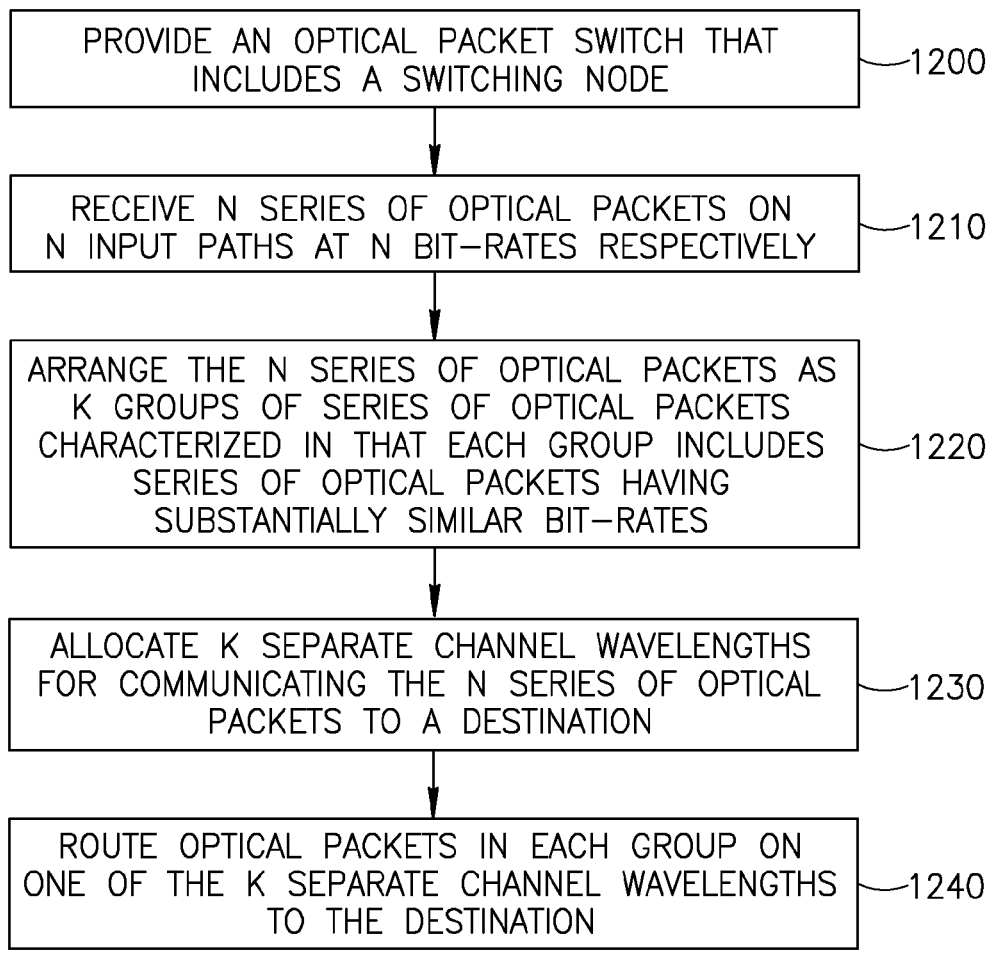
FIG. 13 is a simplified flowchart illustration of yet another preferred method of operation of the apparatus of FIGS. 1-3.

Reference is now made to FIG. 13 which is a simplified flowchart illustration of another preferred method of operation of the apparatus of FIGS. 1-3.

An optical packet switch that includes a switching node is preferably provided (step 1200). The switching node preferably receives N series of optical packets on N input paths at N bit-rates respectively (step 1210), where N is an integer greater than two.

Preferably, the N series of optical packets are arranged as K groups of series of optical packets (step 1220), where $K \leq N$ and the K groups are characterized in that each group includes series of optical packets having substantially similar bit-rates, and bit-rates of series in each group differ from bit-rates of series in other groups. Then, K separate channel wavelengths are allocated for communicating the K groups of series of optical packets to a destination (step 1230), and optical packets in each group are routed on a corresponding one of the K separate channel wavelengths to the destination (step 1240).

Figure 14:
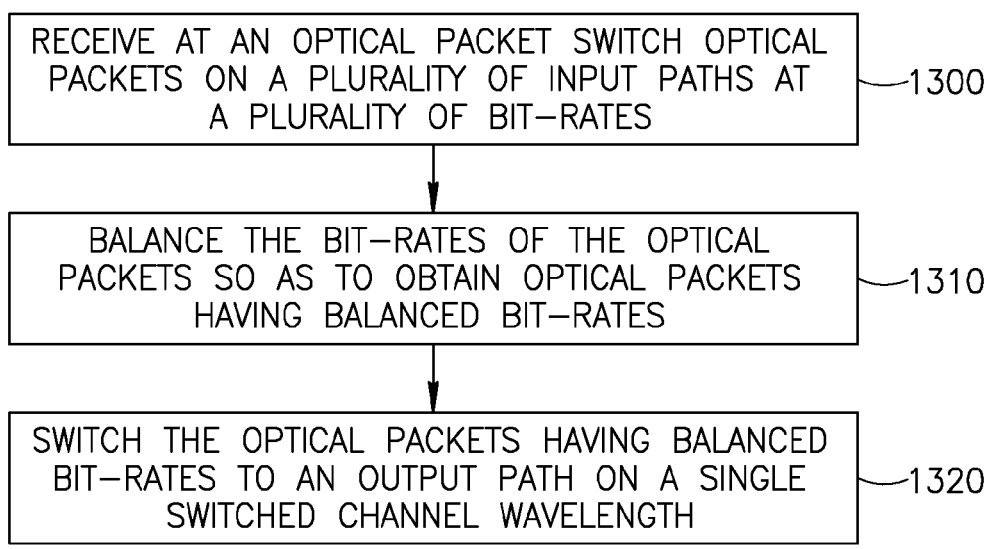
FIG. 14 is a simplified flowchart illustration of still another preferred method of operation of the apparatus of FIGS. 1-3.

Reference is now made to FIG. 14 which is a simplified flowchart illustration of another preferred method of operation of the apparatus of FIGS. 1-3.

An optical packet switch preferably receives on a plurality of input paths optical packets at a plurality of bit-rates (step 1300). Preferably, the bit-rates of the optical packets are balanced up to a bit-rate difference level within a predetermined equalization range so as to obtain optical packets having balanced bit-rates (step 1310). Then, the optical packets having balanced bit-rates are preferably switched to an output path on a single switched channel wavelength (step 1320).

Figure 15:
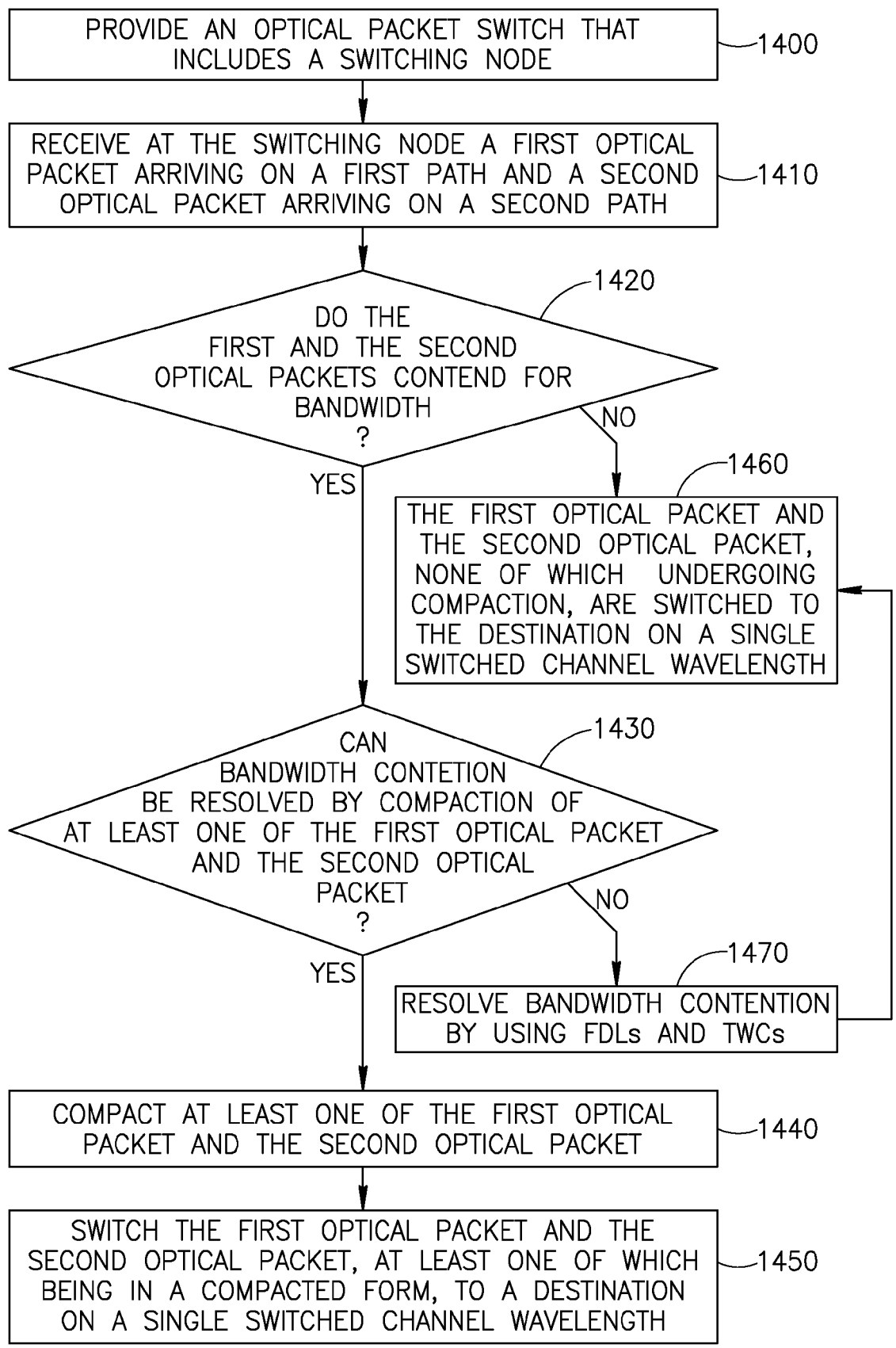
FIG. 15 is a simplified flowchart illustration of yet another preferred method of operation of the apparatus of FIGS. 1-3.

Reference is now made to FIG. 15 which is a simplified flowchart illustration of another preferred method of operation of the apparatus of FIGS. 1-3.

An optical packet switch that includes a switching node is preferably provided (step 1400). The switching node preferably receives a first optical packet arriving on a first path and a second optical packet arriving on a second path (step 1410).

If the first and second optical packets contend for bandwidth (step 1420), a determination that bandwidth contention can be resolved by compaction of at least one of the first optical packet and the second optical packet is preferably generated (step 1430), and at least one of the first optical packet and the second optical packet is compacted in response to the determination (step 1440). Then, the first optical packet and the second optical packet, at least one of which being in a compacted form, are switched to a destination on a single switched channel wavelength (step 1450).

If the first and second optical packets do not contend for bandwidth, the first optical packet and the second optical packet, none of which undergoing compaction, may be switched to the destination on a single switched channel wavelength (step 1460).

If the bandwidth contention cannot be resolved by compaction of at least one of the first optical packet and the second optical packet, the bandwidth contention is resolved by employing conventional FDLs and TWCs (step 1470). After the bandwidth contention is resolved, the first optical packet and the second optical packet may be switched to the destination on a single switched channel wavelength.

Figure 16:
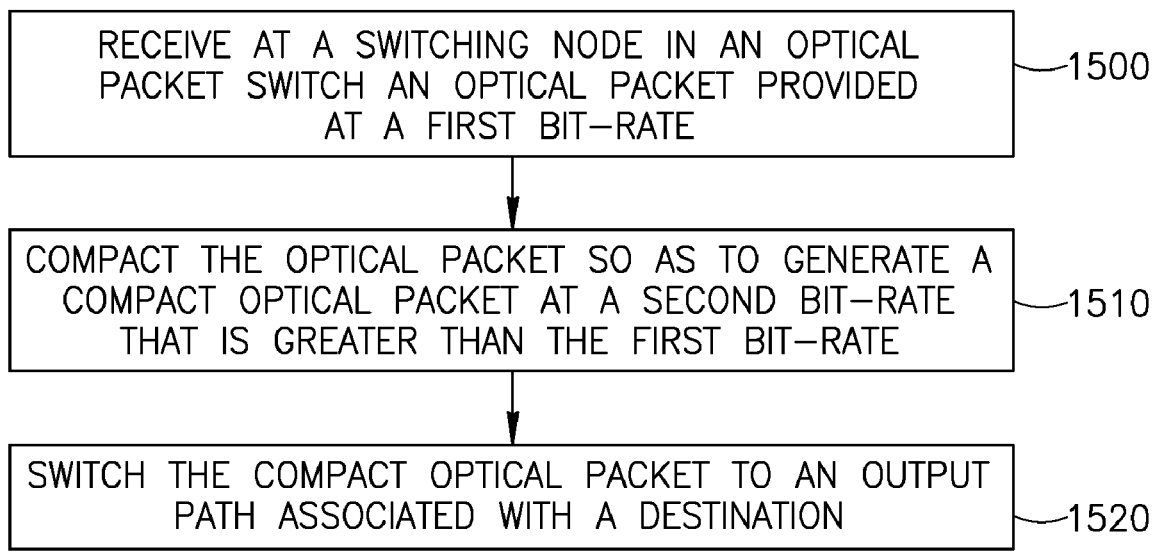
FIG. 16 is a simplified flowchart illustration of still another preferred method of operation of the apparatus of FIGS. 1-3.

Reference is now made to FIG. 16 which is a simplified flowchart illustration of another preferred method of operation of the apparatus of FIGS. 1-3.

A switching node in an optical packet switch preferably receives an optical packet at a first bit-rate (step 1500). The optical packet is preferably compacted so as to generate a compact optical packet at a second bit-rate that is greater than the first bit-rate (step 1510). Then, the compact optical packet is switched to an output path associated with a destination (step 1520).

Figure 17:
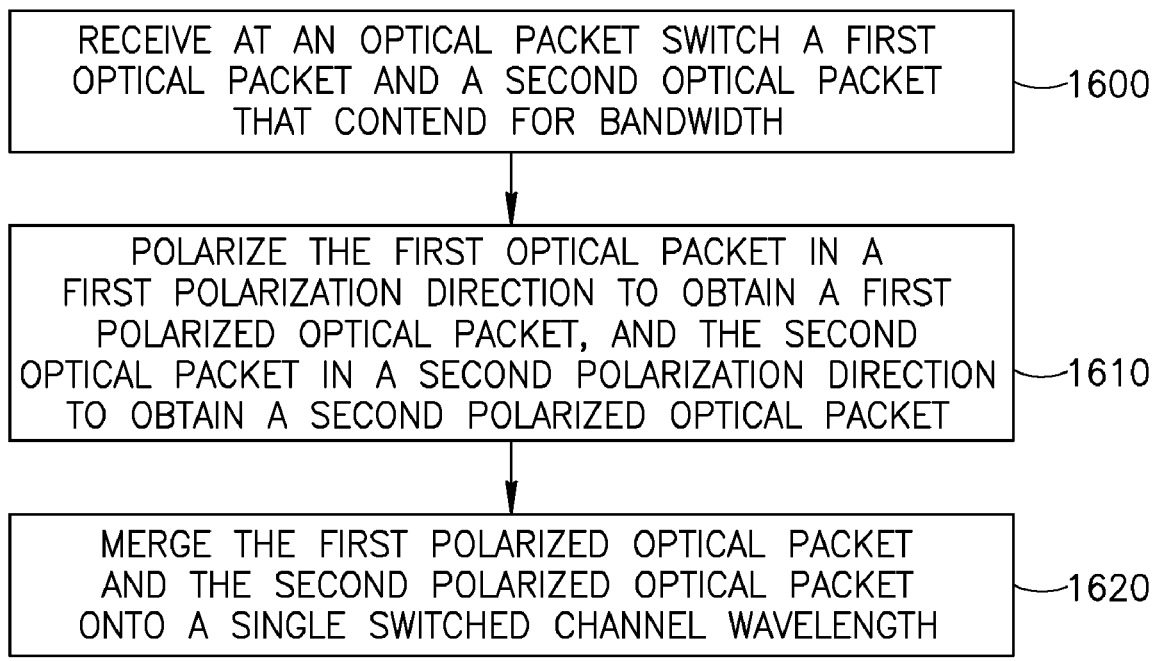
FIG. 17 is a simplified flowchart illustration of yet another preferred method of operation of the apparatus of FIGS. 1-3.

Reference is now made to FIG. 17 which is a simplified flowchart illustration of another preferred method of operation of the apparatus of FIGS. 1-3.

Preferably, an optical packet switch receives a first optical packet and a second optical packet that contend for bandwidth (step 1600). The first optical packet arrives on a first path and the second optical packet arrives on a second path.

Preferably, the first optical packet is polarized in a first polarization direction to obtain a first polarized optical packet, and the second optical packet is polarized in a second polarization direction to obtain a second polarized optical packet (step 1610). Then, the first polarized optical packet and the second polarized optical packet are merged onto a single switched channel wavelength (step 1620).

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. An optical packet switching method for use at a switching node that receives a first optical packet on a first input path at a first bit-rate and a second optical packet on a second input path at a second bit-rate, the method comprising:
    determining a magnitude of a difference between the first bit-rate and the second bit-rate; and
    routing the first optical packet and the second optical packet to the destination at a separate time slots over a single channel wavelength if the magnitude of a difference between the first bit-rate and the second bit-rate does not exceed a bit-rate difference threshold.

2. The method according to claim 1 wherein each of the first optical packet and the second optical packet comprises at least one of a fixed-length optical packet or a variable-length optical packet or any combination thereof.

3. The method according to claim 1 and wherein the determining comprises:
    obtaining a first bit-rate identifier associated with the first optical packet by analyzing a first header associated with the first optical packet;
    obtaining a second bit-rate identifier associated with the second optical packet by analyzing a second header associated with the second optical packet; and
    comparing the first bit-rate identifier with the second bit-rate identifier to obtain the magnitude of a difference between the first bit-rate and the second bit-rate.

4. The method according to claim 3 wherein each of the first bit-rate identifier and the second bit-rate identifier comprises at least one of the following: a source identifier; a label; or an overhead byte or any combination thereof.

5. The method according to claim 1 and wherein the bit-rate difference threshold is about zero.

6. An optical packet switching method for use at a switching node that receives a first optical packet on a first input path at a first bit-rate and a second optical packet on a second input path at a second bit-rate, the method comprising:
    determining a magnitude of a difference between the first bit-rate and the second bit-rate; and
    if the magnitude of a difference between the first bit-rate and the second bit-rate exceeds a bit-rate difference threshold, switching the first optical packet to a destination via a first optical communication switch that is operatively associated with the destination and the second optical packet to the destination via a second optical communication switch that is operatively associated with the destination.

7. The method according to claim 6 and wherein each of the first optical packet and the second optical packet comprises one of the following: a fixed-length optical packet; or a variable-length optical packet.

8. An optical packet switching method for use at a switching node that receives N series of optical packets on N input paths at N bit-rates respectively, where N is an integer greater than two, the method comprising:
- determining the N bit-rates;
- based on the N bit-rates, arranging the N series optical packets as K groups of series of optical packets, where K≦N and the K groups are characterized in that each group includes series of optical packets having substantially similar bit-rates, and bit-rates of series in each group differ from bit-rates of series in other groups; and
- routing optical packets in each K group to a destination on a respective channel wavelength.

9. The method according to claim 8 and wherein each optical packet in the N series of optical packets comprises one of the following: a fixed-length optical packet; and a variable-length optical packet.

10. The method according to claim 8 and wherein determining the N bit-rates comprises determining the N bit-rates by obtaining a bit-rate identifier from a header associated with at least one optical packet in each of the N series.

11. A method of switching or routing optical packets, comprising:
- receiving a first optical packet on a first input path at a first bit-rate;
- receiving a second optical packet on a second input path at a second bit-rate;
- determining a magnitude of a difference between the first bit-rate and the second bit-rate; and
- routing the first optical packet to a destination over a first channel wavelength and the second optical packet to the destination over a second channel wavelength in response to the difference between the first bit-rate and the second bit-rate exceeding a particular value.

12. The method according to claim 11 wherein the act of determining a difference between the first bit-rate and the second bit-rate comprises obtaining a first bit-rate identifier associated with the first optical packet by analyzing a first header associated with the first optical packet and obtaining a second bit-rate identifier associated with the second optical packet by analyzing a second header associated with the second optical packet, and comparing the first bit-rate identifier with the second bit-rate identifier to obtain the magnitude of a difference between the first bit-rate and the second bit-rate.

13. The method according to claim 11 wherein the first optical packet and the second optical packet comprises at least one of a fixed-length optical packet or a variable-length optical packet or any combination thereof.

14. The method according to claim 11 wherein the first channel wavelength and the second channel wavelength are in the same wavelength band.

15. The method according to claim 11 wherein each of the first channel wavelength and the second channel wavelength comprises a wavelength in a wavelength band on the order of tens of nanometer (nm).

16. The method according to claim 15 wherein the wavelength band is approximately at least one of 780 nm, 980 nm, 1310 nm, 1480 nm, 1510 nm, 1550 nm, or 1620 nm.

17. The method according to claim 11 further comprising:
- obtaining a first bit-rate identifier associated with the first optical packet by analyzing a first header associated with the first optical packet; and
- obtaining a second bit-rate identifier associated with the second optical packet by analyzing a second header associated with the second optical packet.

18. The method according to claim 11 wherein the act of determining a magnitude of a difference between the first bit-rate and the second bit-rate comprises comparing the first bit-rate identifier with the second bit-rate identifier to obtain the magnitude of a difference between the first bit-rate and the second bit-rate.

* * * * *

UNITED STATES PATENT AND TRADEMARK OFFICE
CERTIFICATE OF CORRECTION

PATENT NO. : 7,720,379 B2  Page 1 of 1
APPLICATION NO. : 12/020558
DATED : May 18, 2010
INVENTOR(S) : Doron Handelman It is certified that error appears in the above-identified patent and that said Letters Patent is hereby corrected as shown below:

| Column, Line | Reads | Should Read |
|---|---|---|
| Column 32, Line 23 | "at a separate time slots" | --at separate time slots-- |
| Column 33, Line 6 | "$K \leqq N$" | --$K \leq N$-- |

Signed and Sealed this

Thirty-first Day of August, 2010

David J. Kappos
*Director of the United States Patent and Trademark Office*